United States Patent
Takao

(10) Patent No.: US 10,326,924 B2
(45) Date of Patent: Jun. 18, 2019

(54) FOCUS DETECTION APPARATUS AND METHOD, IMAGE CAPTURING APPARATUS, AND LENS UNIT

(71) Applicant: CANON KABUSHIKI KAISHA, Tokyo (JP)

(72) Inventor: Yumi Takao, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/621,251

(22) Filed: Jun. 13, 2017

(65) Prior Publication Data

US 2017/0374271 A1 Dec. 28, 2017

(30) Foreign Application Priority Data

Jun. 27, 2016 (JP) .................................. 2016-126737

(51) Int. Cl.
*H04N 5/232* (2006.01)
*G03B 3/10* (2006.01)
*G03B 13/36* (2006.01)

(52) U.S. Cl.
CPC ........... *H04N 5/23212* (2013.01); *G03B 3/10* (2013.01); *G03B 13/36* (2013.01)

(58) Field of Classification Search
CPC .... G02B 7/04–7/105; G02B 7/28–7/40; G02B 7/09; G02B 7/102; G03B 13/36; H04N 5/23212
USPC ............... 359/696, 698; 382/255; 250/201.6; 396/79–83, 89–152; 348/345–357
See application file for complete search history.

(56) References Cited

U.S. PATENT DOCUMENTS

| 7,456,886 B2 | 11/2008 | Shinohara |
| 9,936,122 B2 | 4/2018 | Hamano |
| 2011/0085786 A1* | 4/2011 | Tamaki .................... G02B 7/34 396/104 |

(Continued)

FOREIGN PATENT DOCUMENTS

| JP | 2004-134867 A | 4/2004 |
| JP | 2007-121504 A | 5/2007 |
| JP | 2016-057516 A | 4/2016 |

OTHER PUBLICATIONS

U.S. Appl. No. 15/413,487, filed Jan. 24, 2017 (First Named Inventor: Yumi Takao).

(Continued)

*Primary Examiner* — Xi Wang
(74) *Attorney, Agent, or Firm* — Venable LLP

(57) ABSTRACT

A focus detection apparatus comprising: a focus detection unit that detects an in-focus position using an image signal obtained by an image sensor photoelectrically converting light that has entered via an imaging optical system; a first acquisition unit that acquires aberration information of the imaging optical system; a generating unit that generates a recording image using the image signal; a calculation unit that calculates, on the basis of the aberration information, a correction value for correcting a difference between the in-focus position detected by the focus detection unit and a position to be focused on in the recording image; and a correction unit that corrects the in-focus position using the correction value. The calculation unit calculates the correction value on the basis of information of a display unit that displays an image based on the image signal.

14 Claims, 14 Drawing Sheets

(56) References Cited

U.S. PATENT DOCUMENTS

| | | | | |
|---|---|---|---|---|
| 2012/0081583 A1* | 4/2012 | Kikuchi | ................ | H04N 9/045 |
| | | | | 348/242 |
| 2013/0215318 A1* | 8/2013 | Ino | ...................... | H04N 5/3572 |
| | | | | 348/335 |
| 2014/0218564 A1* | 8/2014 | Tomosada | .............. | G02B 7/102 |
| | | | | 348/231.6 |

OTHER PUBLICATIONS

Office Action dated Sep. 7, 2018, in Japanese Patent Application No. 2016-126737.

* cited by examiner

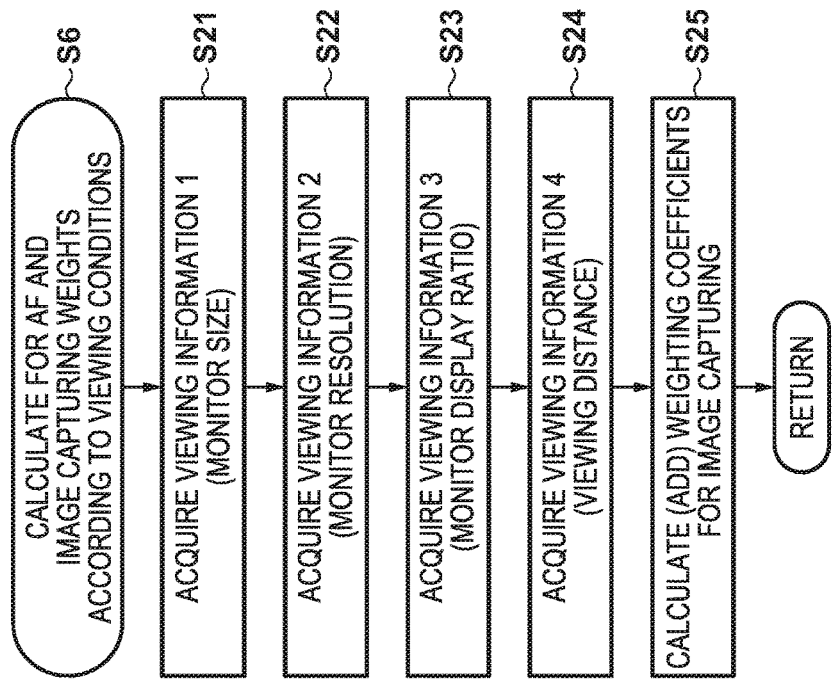
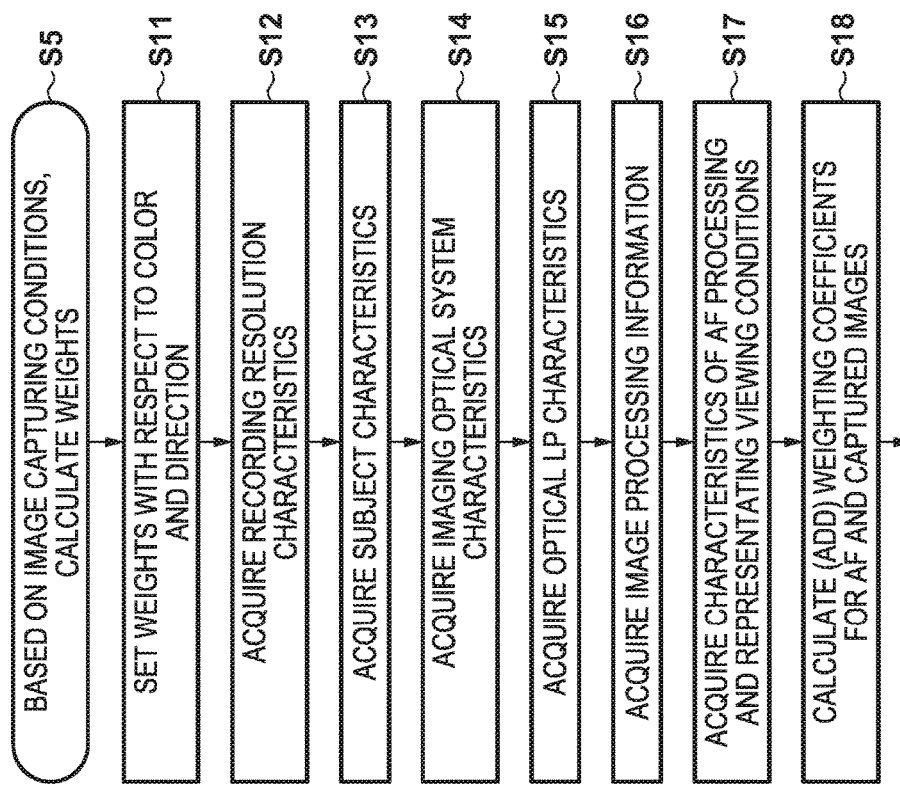

F I G. 8A

| | DIRECTION | | COLOR | | |
|---|---|---|---|---|---|
| | HORIZONTAL | VERTICAL | RED | GREEN | BLUE |
| FOCUS DETECTION | K_AF_H | K_AF_V | K_AF_R | K_AF_G | K_AF_B |
| CAPTURED IMAGE | K_IMG_H | K_IMG_V | K_IMG_R | K_IMG_G | K_IMG_B |

F I G. 8B

| | FREQUENCY | | | |
|---|---|---|---|---|
| | fq1 | fq2 | fq3 | fq4 |
| FOCUS DETECTION | K_AF_fq1 | K_AF_fq2 | K_AF_fq3 | K_AF_fq4 |
| CAPTURED IMAGE | K_IMG_fq1 | K_IMG_fq2 | K_IMG_fq3 | K_IMG_fq4 |

FIG. 11A
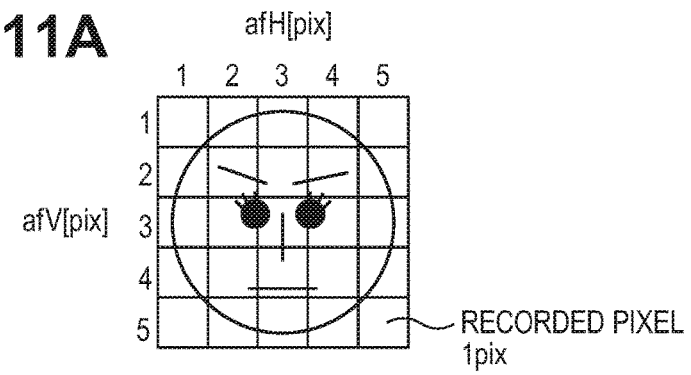
FIG. 11B
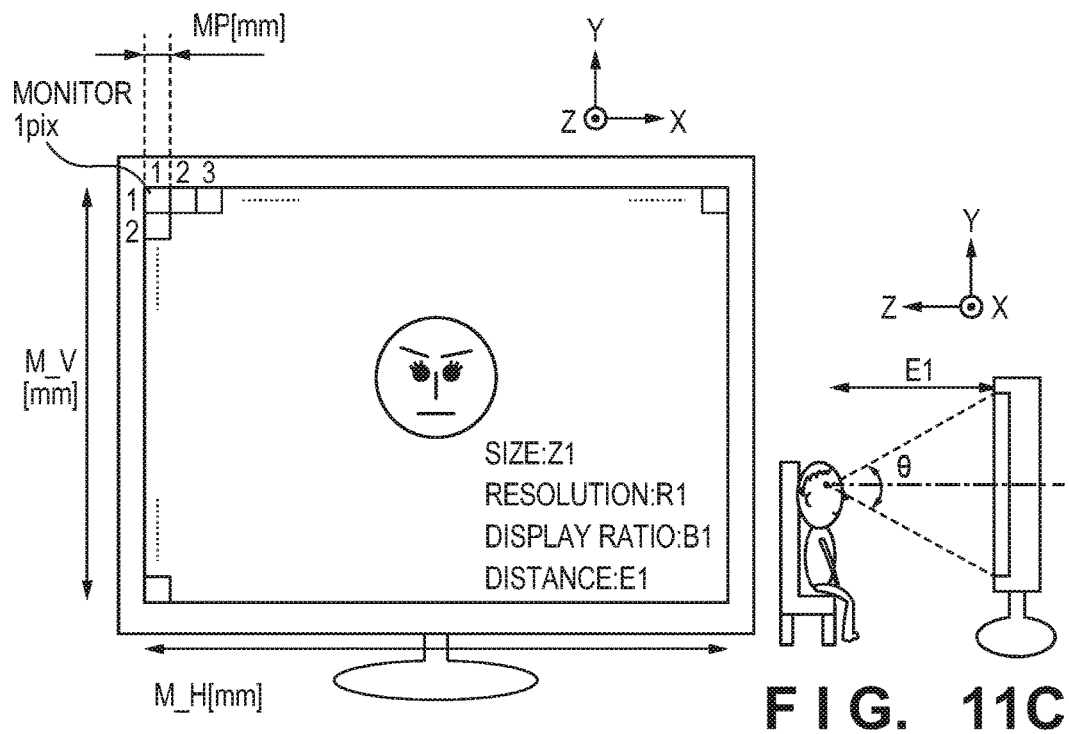
FIG. 11C
FIG. 11D
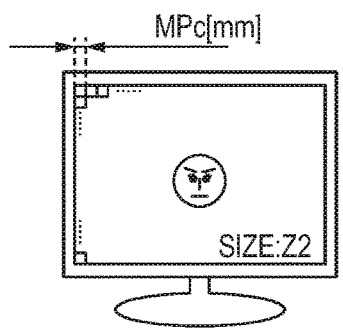

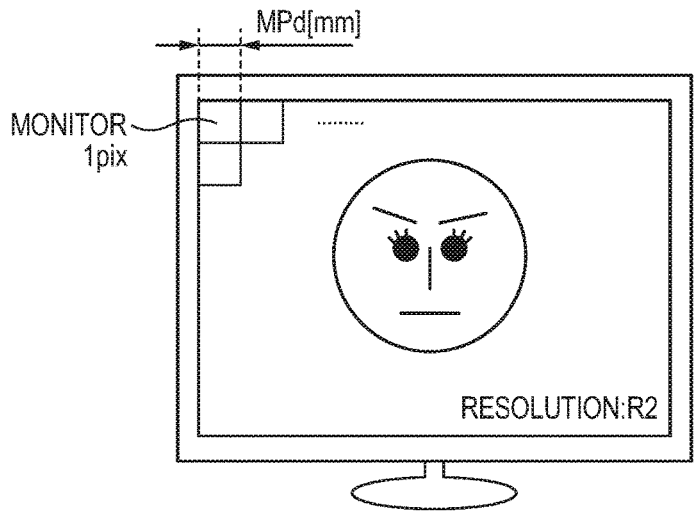
FIG. 11E
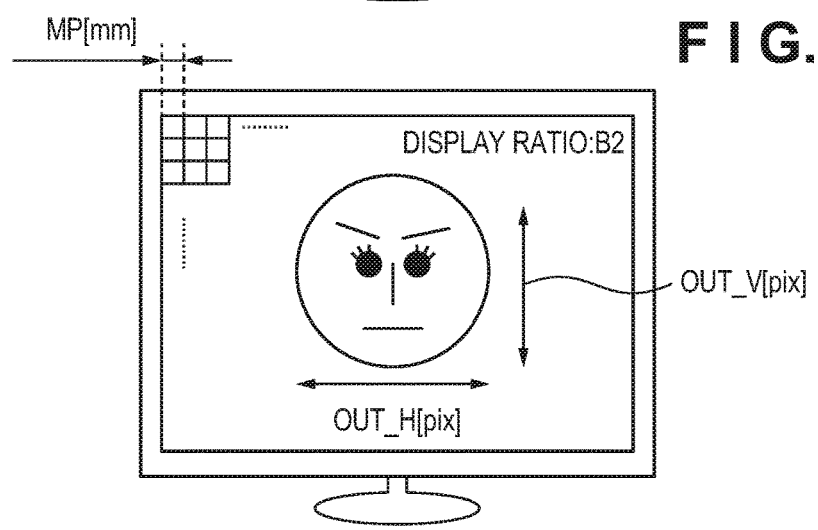
FIG. 11F
FIG. 11G
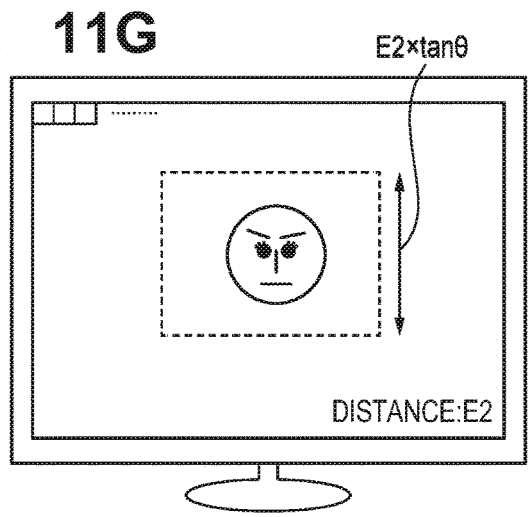
FIG. 11H
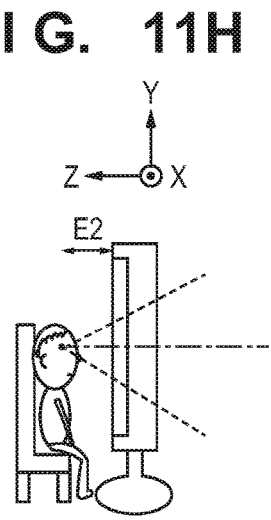

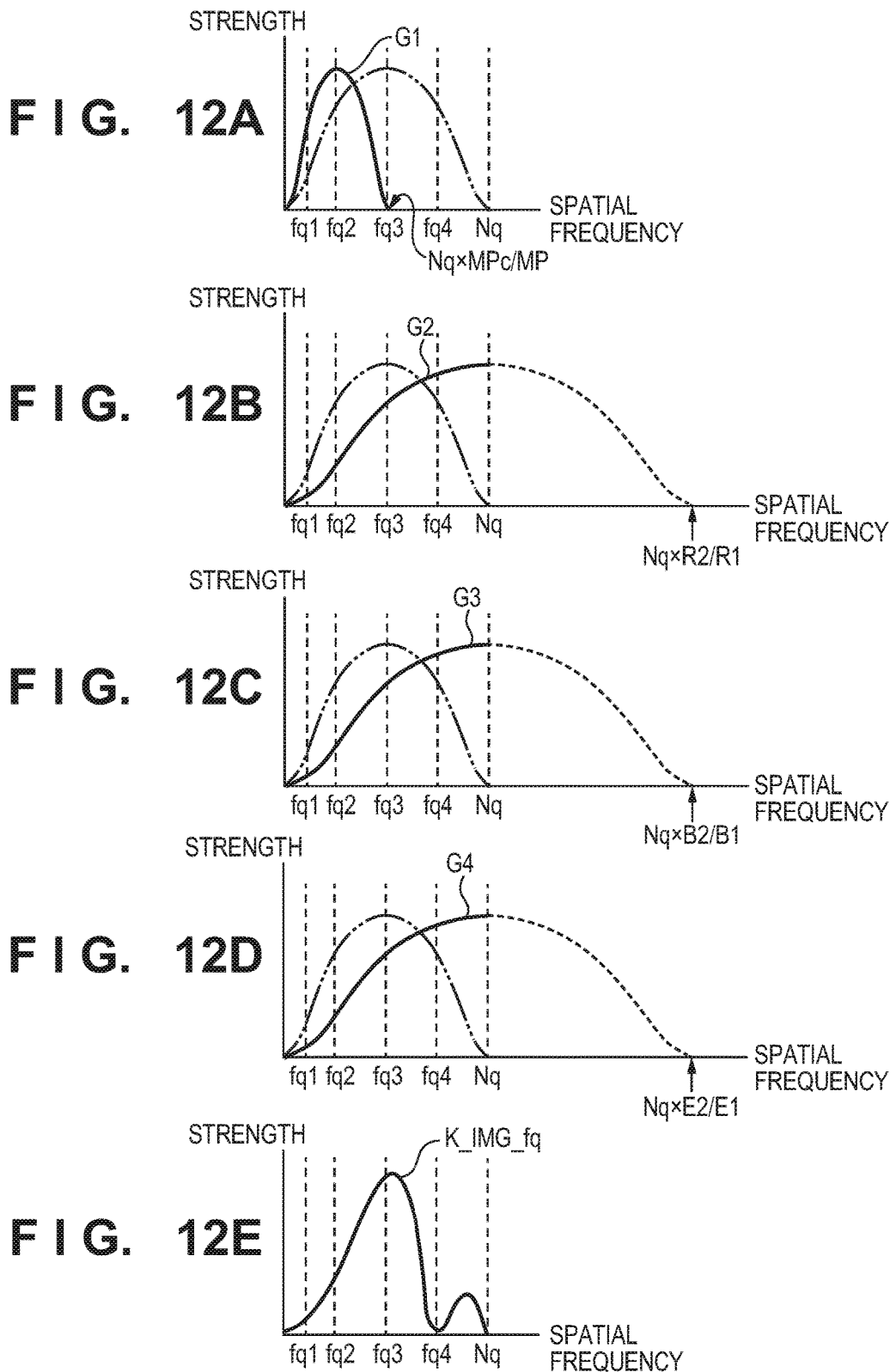

FOCUS DETECTION APPARATUS AND METHOD, IMAGE CAPTURING APPARATUS, AND LENS UNIT

BACKGROUND OF THE INVENTION

Field of the Invention

The present invention relates to a focus detection apparatus and method, an image capturing apparatus, and a lens unit, and particularly relates to a focus detection apparatus and method, an image capturing apparatus, and a lens unit that carry out focus detection on the basis of a signal obtained by photoelectrically converting light entering through an imaging optical system.

Description of the Related Art

Contrast AF and phase difference AF are known as typical examples of conventional automatic focus detection (AF) methods used in image capturing apparatuses. Contrast AF and phase difference AF are both AF methods widely used in video cameras, digital still cameras, and so on, and there are also methods that use an image sensor as a sensor for focus detection.

These AF methods use optical images to carry out focus detection. As such, there are cases where error arises in the focus detection result due to differences in the resolutions of the captured image and the image used during AF, and aberration in the optical system that forms the optical image. Additionally, a user will focus on different frequencies depending on the environment in which a captured image is viewed, resulting in aberration in the optical system that can cause error to arise in the focus detection result. This focus detection error is originally a difference between a focus state in which the viewer senses that the image to be captured is in the best state of focus, and a focus state indicated by the focus detection result. Such focus detection error arises depending on an evaluation frequency band of a focus adjustment signal used in contrast AF, phase difference AF, or the like, regardless of which of the above-described focus adjustment methods is used.

Methods for reducing such error have been proposed. Japanese Patent Laid-Open No. 2007-121504 discloses a method for switching AF systems depending on capturing details (for example, set conditions such as a capturing resolution, compression rate, whether a moving picture or a still image is to be recorded, whether an HD or SD recording mode is used, and so on). According to Japanese Patent Laid-Open No. 2007-121504, contrast AF, which is generally capable of highly-accurate focus detection, is selected in the case where a still image is to be recorded at a high capturing resolution, whereas phase difference AF is selected in the case where a moving picture is to be recorded at a low capturing resolution, for example.

However, although Japanese Patent Laid-Open No. 2007-121504 mentions changing the AF method depending on the capturing resolution, it does not mention changing a focus detection position depending on the capturing resolution. Japanese Patent Laid-Open No. 2007-121504 also does not mention changing the focal position depending on the viewing environment of the captured image. Thus the configuration disclosed in Japanese Patent Laid-Open No. 2007-121504 has a problem in that focus detection error cannot be corrected to a sufficient extent.

SUMMARY OF THE INVENTION

The present invention has been made in consideration of the above situation, and makes it possible to carry out focus adjustment according to a viewing environment and so on of a captured image that is displayed.

According to the present invention, provided is a focus detection apparatus comprising: a focus detection unit that detects an in-focus position using an image signal obtained by an image sensor photoelectrically converting light that has entered via an imaging optical system; a first acquisition unit that acquires aberration information of the imaging optical system; a generating unit that generates a recording image using the image signal obtained from the image sensor; a calculation unit that calculates, on the basis of the aberration information, a correction value for correcting a difference between the in-focus position detected by the focus detection unit and a position to be focused on in the recording image; and a correction unit corrects the in-focus position using the correction value, wherein the calculation unit calculates the correction value on the basis of information of a display unit that displays an image based on the image signal.

Further, according to the present invention, provided is an image capturing apparatus comprising: an image sensor that photoelectrically converts light that has entered via an imaging optical system into an image signal and outputs the image signal; and a focus detection apparatus that comprises: a focus detection unit that detects an in-focus position using the image signal obtained by the image sensor; a first acquisition unit that acquires aberration information of the imaging optical system; a generating unit that generates a recording image using the image signal obtained from the image sensor; a calculation unit that calculates, on the basis of the aberration information, a correction value for correcting a difference between the in-focus position detected by the focus detection unit and a position to be focused on in the recording image; and a correction unit that corrects the in-focus position using the correction value, wherein the calculation unit calculates the correction value on the basis of information of a display unit that displays an image based on the image signal.

Furthermore, according to the present invention, provided is a lens unit comprising: an input unit that inputs an in-focus position of a focus lens, the in-focus position being detected using an image signal obtained by an image sensor photoelectrically converting light that has entered via an imaging optical system including the lens unit having the focus lens; a first acquisition unit that acquires first weighting information corresponding to a state of aberration of the imaging optical system occurring when an image based on the image signal is displayed in a display unit and viewed; a second acquisition unit that acquires second weighting information corresponding to a state of aberration of the imaging optical system occurring when the in-focus position is detected; a calculation unit that calculates a correction value, for correcting the in-focus position, from the aberration information of the imaging optical system, the first weighting information, and the second weighting information; a correction unit that corrects the in-focus position using the correction value; and a driving unit that drives the focus lens on the basis of the corrected in-focus position, wherein the first acquisition unit acquires the first weighting information on the basis of image capturing conditions of the image signal and viewing conditions of the image.

Further, according to the present invention, provided is a focus detection method comprising: detecting an in-focus position using an image signal obtained by an image sensor photoelectrically converting light that has entered via an imaging optical system; acquiring aberration information of the imaging optical system; generating a recording image using the image signal obtained from the image sensor; calculating, on the basis of the aberration information, a correction value for correcting a difference between the detected in-focus position and a position to be focused on in the recording image; correcting the in-focus position using the correction value; and calculating the correction value on the basis of information of a display unit that displays an image based on the image signal.

Further, according to the present invention, provided is a focus detection method comprising: inputting an in-focus position of a focus lens, the in-focus position being detected using an image signal obtained by an image sensor photoelectrically converting light that has entered via an imaging optical system including a lens unit having the focus lens; acquiring first weighting information corresponding to a state of aberration of the imaging optical system occurring when an image based on the image signal is displayed in a display unit and viewed; acquiring second weighting information corresponding to a state of aberration of the imaging optical system occurring when the in-focus position is detected; calculating a correction value, for correcting the in-focus position, from the aberration information of the imaging optical system, the first weighting information, and the second weighting information; correcting the in-focus position using the correction value; and acquiring the first weighting information on the basis of image capturing conditions of the image signal and viewing conditions of the image.

Further, according to the present invention, provided is a computer-readable storage medium on which is stored a program for causing a computer to execute the steps of the focus detection method, comprising: detecting an in-focus position using an image signal obtained by an image sensor photoelectrically converting light that has entered via an imaging optical system; acquiring aberration information of the imaging optical system; generating a recording image using the image signal obtained from the image sensor; calculating, on the basis of the aberration information, a correction value for correcting a difference between the detected in-focus position and a position to be focused on in the recording image; correcting the in-focus position using the correction value; and calculating the correction value on the basis of information of a display unit that displays an image based on the image signal.

Further, according to the present invention, provided is a computer-readable storage medium on which is stored a program for causing a computer to execute the steps of the focus detection method, comprising: inputting an in-focus position of a focus lens, the in-focus position being detected using an image signal obtained by an image sensor photoelectrically converting light that has entered via an imaging optical system including a lens unit having the focus lens; acquiring first weighting information corresponding to a state of aberration of the imaging optical system occurring when an image based on the image signal is displayed in a display unit and viewed; acquiring second weighting information corresponding to a state of aberration of the imaging optical system occurring when the in-focus position is detected; calculating a correction value, for correcting the in-focus position, from the aberration information of the imaging optical system, the first weighting information, and the second weighting information; correcting the in-focus position using the correction value; and acquiring the first weighting information on the basis of image capturing conditions of the image signal and viewing conditions of the image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A to 6C are flowcharts illustrating AF operations according to the embodiment;

FIGS. 8A and 8B are diagrams illustrating weighting coefficients according to the embodiment;

FIGS. 11A to 11H are diagrams for describing viewing environments and displayed images according to the embodiment; and FIGS. 12A to 12E are diagrams illustrating various spatial frequency characteristics depending on viewing conditions according to the embodiment.

DESCRIPTION OF THE EMBODIMENTS

Exemplary embodiments of the present invention will be described in detail in accordance with the accompanying drawings. Note that, although the embodiments have specific configurations for the purpose of facilitating understanding and description of the present invention, the present invention is not limited to these specific configurations. For example, although a description will be given below of embodiments in which a focus adjustment device and a method for controlling the focus adjustment device according to the present invention are applied to an image capturing apparatus, specifically a lens-interchangeable single-lens reflex digital camera, the present invention is also applicable to a digital camera whose lens is not interchangeable, and a video camera. The present invention can also be implemented in any electronic device having a camera, e.g., a mobile phone, a personal computer (laptop, tablet, desktop PC, etc.), a game machine, and the like. Furthermore, the present invention can also be implemented in any device that performs focus adjustment of an optical system.

First Embodiment

Description of Configuration of Image Capturing Apparatus—Lens Unit

Figure 1:
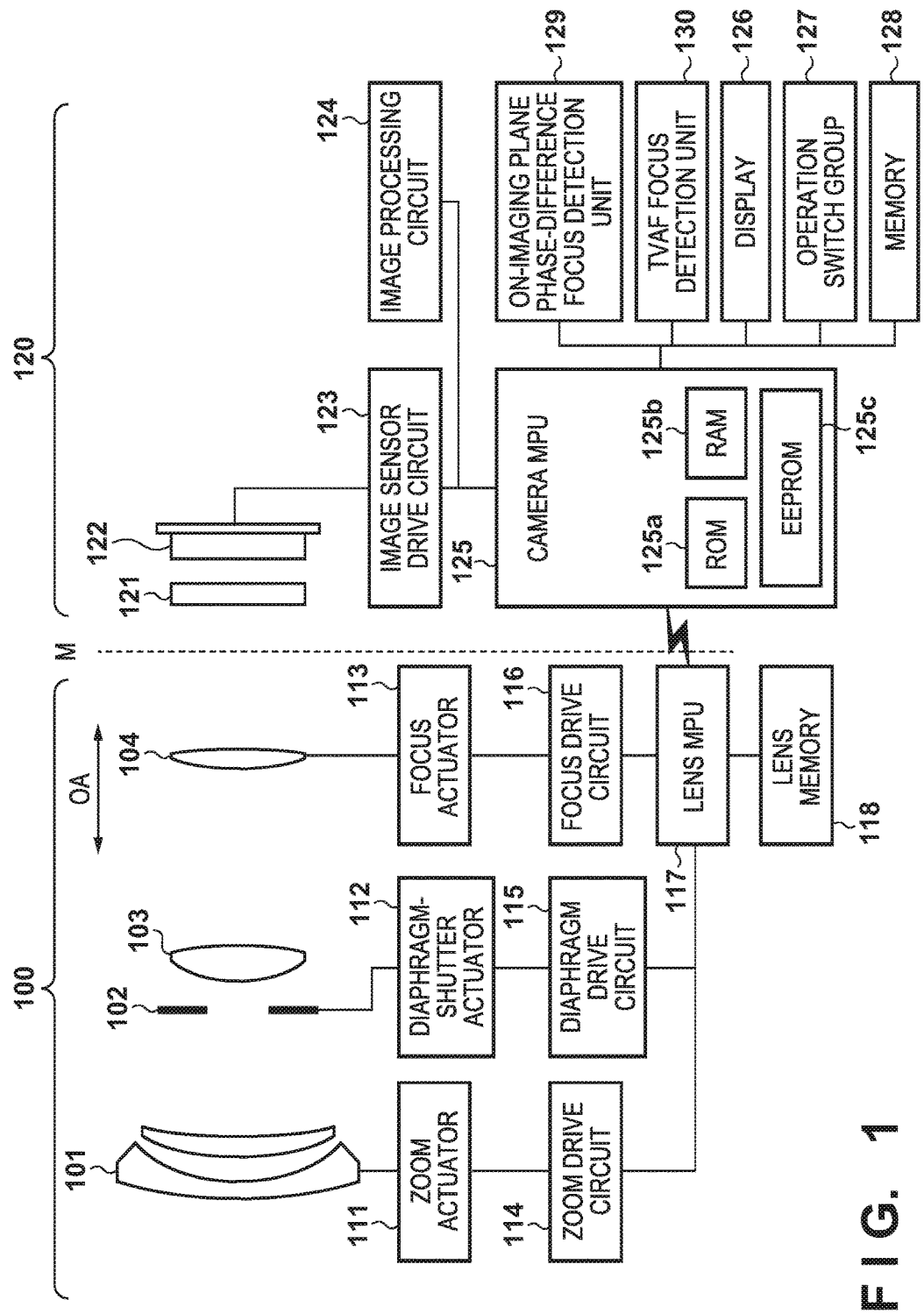
FIG. 1 is a block diagram schematically illustrating a structure of a digital camera according to an embodiment of the present invention.

FIG. 1 is a block diagram illustrating an exemplary configuration of functions of a digital camera as an example of an image capturing apparatus according to an embodiment. As described above, the digital camera in the present embodiment is a lens-interchangeable single-lens reflex camera, and has a lens unit 100 and a camera body 120. The lens unit 100 is mounted on a camera body 120 via a mount M denoted by a dotted line at the center of FIG. 1.

The lens unit 100 has an optical system (first lens group 101, diaphragm-shutter 102, second lens group 103, and focus lens group (hereinafter referred to simply as "focus lens") 104) and a drive/control system. Thus, the lens unit 100 is an imaging lens that includes the focus lens 104 and forms an optical image of a subject.

The first lens group 101 is arranged at a tip of the lens unit 100, and is held so as to be able to move in an optical axis direction OA. The diaphragm-shutter 102 has a function of adjusting the amount of light at the time of imaging by adjusting its aperture diameter, and also functions as a mechanical shutter for controlling exposure time when taking a still image. The diaphragm-shutter 102 and the second lens group 103 can integrally move in the optical axis direction OA, and achieve a zoom function by moving in conjunction with the first lens group 101. The focus lens 104 can also move in the optical axis direction OA, and the subject distance (in-focus distance or focused distance) at which the lens unit 100 focuses changes in accordance with the position of the focus lens 104. Focus adjustment, i.e., adjustment of the in-focus distance of the lens unit 100 is performed by controlling the position of the focus lens 104 in the optical axis direction OA.

The drive/control system has a zoom actuator 111, a diaphragm-shutter actuator 112, a focus actuator 113, a zoom drive circuit 114, a diaphragm drive circuit 115, a focus drive circuit 116, a lens MPU (microprocessor) 117, and a lens memory 118.

The zoom drive circuit 114, according to a zoom operation by a photographer, drives the zoom actuator 111 to drive the first lens group 101 and the second lens group 103 in the optical axis direction OA, thus controlling an angle of view of the optical system of the lens unit 100. The diaphragm drive circuit 115 drives the diaphragm-shutter actuator 112 to control the aperture diameter and opening/closing operation of the diaphragm-shutter 102. The focus drive circuit 116 drives the focus lens 104 in the optical axis direction OA using the focus actuator 113, thus changing the in-focus distance of the optical system of the lens unit 100. The focus drive circuit 116 detects the current position of the focus lens 104 using the focus actuator 113.

The lens MPU 117 performs all calculation and control relating to the lens unit 100, and controls the zoom drive circuit 114, the diaphragm drive circuit 115, and the focus drive circuit 116. The lens MPU 117 is connected to a camera MPU 125 through the mount M, and communicates commands and data therewith. For example, the lens MPU 117 detects the position on the optical axis of the focus lens 104, and notifies the camera MPU 125 of lens position information in accordance with a request from the camera MPU 125. This lens position information contains information such as a position of the focus lens 104 in the optical axis direction OA, the position in the optical axis direction OA and the diameter of an exit pupil in a state where the optical system is not moving, and the position in the optical axis direction OA and the diameter of a lens frame that limits light beams of the exit pupil. The lens MPU 117 also controls the zoom drive circuit 114, the diaphragm drive circuit 115, and the focus drive circuit 116, in accordance with a request from the camera MPU 125. Optical information necessary for autofocus is stored in advance in the lens memory 118. The camera MPU 125 controls operations of the lens unit 100 by executing a program stored in a nonvolatile memory embedded in the camera MPU 125 or the lens memory 118.

Description of Configuration of Image Capturing Apparatus—Camera Body

The camera body 120 has an optical system (optical low pass filter (LPF) 121 and image sensor 122) and a drive/control system. The first lens group 101, the diaphragm-shutter 102, the second lens group 103, and the focus lens 104 in the lens unit 100, and the optical LPF 121 in the camera body 120 constitute an imaging optical system.

The optical LPF 121 reduces false colors and moiré in a photographic image. The image sensor 122 is constituted by a CMOS image sensor and a peripheral circuit, and has m pixels arranged in the horizontal direction and n pixels arranged in the vertical direction (n and m are integers that are 2 or larger). The image sensor 122 in the present embodiment includes pixels each having a configuration as will be described later with reference to FIG. 2, performs photoelectric conversion on light entered via the imaging optical system, and outputs an image signal. An image processing circuit 124 generates, from the image signal output by the image sensor 122, data for the phase-difference AF and image data for display, recording, and the contrast AF (TVAF).

The drive/control system has an image sensor drive circuit 123, the image processing circuit 124, the camera MPU 125, a display 126, an operation switch group 127, a memory 128, an on-imaging plane phase-difference focus detection unit 129, and a TVAF focus detection unit 130.

The image sensor drive circuit 123 controls operations of the image sensor 122, performs A/D conversion on an obtained image signal, and transmits the converted image signal to the image processing circuit 124 and the camera MPU 125. The image processing circuit 124 performs image processing that is generally performed in a digital camera, such as y conversion, white balancing processing, color interpolation processing, and compression coding processing, on the image data output by the image sensor 122. In addition, the image processing circuit 124 generates a signal for phase difference AF.

The camera MPU (microprocessor) 125 performs all calculation and control relating to the camera body 120, and controls the image sensor drive circuit 123, the image processing circuit 124, the display 126, the operation switch group 127, the memory 128, the on-imaging plane phase-difference focus detection unit 129, and the TVAF focus detection unit 130. The camera MPU 125 is connected to the lens MPU 117 via a signal line of the mount M, and communicates commands and data with the lens MPU 117. The camera MPU 125 issues, to the lens MPU 117, a request to obtain the lens position, a request to drive the diaphragm-shutter 102, the focus lens 104, or zooming at a predetermined drive amount, a request to obtain optical information unique to the lens unit 100, and the like. The camera MPU 125 incorporates a ROM (read only memory) 125a that stores a program for controlling camera operations, a RAM (random access memory) 125b that stores variables, and an EEPROM (electrically erasable programmable read-only memory) 125c that stores various parameters.

The display 126 is constituted by an LCD (liquid crystal display) or the like, and displays information regarding imaging modes of the camera, a preview image before imaging, an image for checking after imaging, an in-focus state display image at the time of focus detection, and the like. The operation switch group 127 is constituted by a power switch, a release (imaging trigger) switch, a zoom operation switch, an imaging mode selection switch, and the like. The memory 128 is a removable memory, such as a flash memory, and records obtained images.

The on-imaging plane phase-difference focus detection unit 129 performs focus detection processing by a phase-difference detection method (on-imaging plane phase difference AF), using data for focus detection obtained by the image processing circuit 124. More specifically, the image processing circuit 124 generates, as the data for focus detection, data of a pair of images formed by light beams passing through a pair of pupil regions in the imaging optical system, and the on-imaging plane phase-difference focus detection unit 129 detects a focus shift amount based on a shift amount in the data of the pair of images. Thus, the on-imaging plane phase-difference focus detection unit 129 in the present embodiment performs the phase-difference AF (on-imaging plane phase-difference AF) based on the output of the image sensor 122, without using a dedicated AF sensor. Operations of the on-imaging plane phase-difference focus detection unit 129 will be described later in detail.

The TVAF focus detection unit 130 performs focus detection processing by a contrast detection method (TVAF), based on an evaluation value for TVAF (contrast information of image data) generated by the image processing circuit 124. In the focus detection processing by the contrast detection method, focus evaluation values are calculated at a plurality of focus lens positions while moving the focus lens 104, and a focus lens position at which the evaluation value reaches its peak is detected as an in-focus position.

Thus, the digital camera in the present embodiment can execute both the on-imaging plane phase-difference AF and the TVAF, and can selectively use one of them in accordance with a situation, or can use them in combination.

Description of Focus Detection Operation: Phase-Difference AF

Operations of the on-imaging plane phase-difference focus detection unit 129 and the TVAF focus detection unit 130 will be further described below. First, operations of the on-imaging plane phase-difference focus detection unit 129 will be described.

Figure 2A:
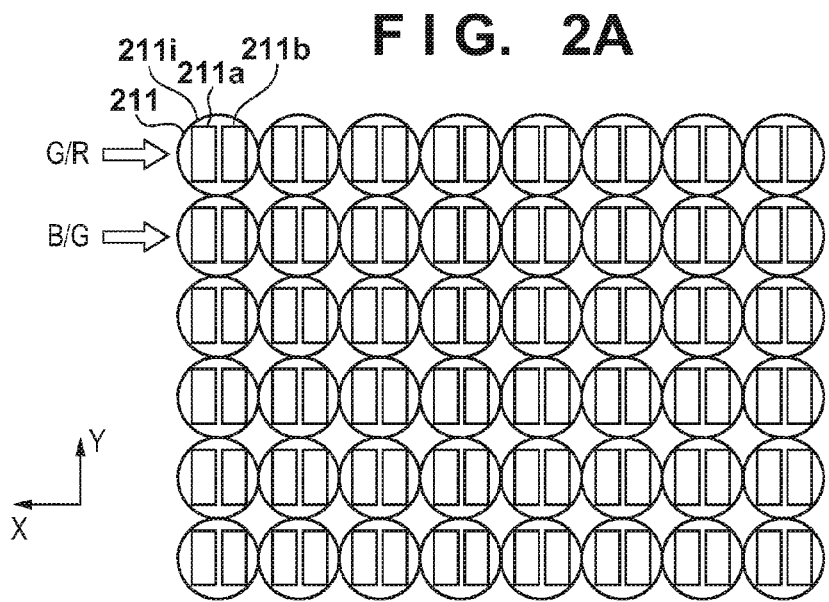
FIGS. 2A and 2B are exemplary diagrams illustrating a structure of an image sensor according to the embodiment.

FIG. 2A is a diagram schematically illustrating a pixel array in the image sensor 122 in the present embodiment, and illustrates a state of an area covering 6 rows in the vertical direction (Y direction) and 8 columns in the horizontal direction (X direction) of a two-dimensional CMOS area sensor, as observed from the lens unit 100 side. The image sensor 122 is provided with a Bayer pattern color filter, where green (G) and red (R) color filters are alternately arranged from left on pixels 211 in an odd-numbered row, and blue (B) and green (G) color filters are alternately arranged from left on pixels 211 in an even-numbered row. In a pixel 211, a circle 211i represents an on-chip microlens, and a plurality of rectangles, namely rectangles 211a and 211b arranged within the on-chip microlens 211i are photoelectric conversion units.

In the image sensor 122 in the present embodiment, the photoelectric conversion unit in every pixel is divided into two portions in the X direction, and photoelectric conversion signals of individual photoelectric conversion units and the sum of the photoelectric conversion signals can be independently read out. By subtracting the photoelectric conversion signal of one of the photoelectric conversion units from the sum of the photoelectric conversion signals, a signal corresponding to the photoelectric conversion signal of the other photoelectric conversion unit can be obtained. The photoelectric conversion signals of the individual photoelectric conversion units can be used as the data for the phase-difference AF, and for generating a parallax image that constitutes a 3D (three-dimensional) image. The sum of the photoelectric conversion signals can be used as usual photographic image data.

A pixel signal in the case of performing the phase-difference AF will now be described. As described later, in the present embodiment, the microlens 211i and divided photoelectric conversion units 211a and 211b in FIG. 2A perform pupil division on exit light beams of the imaging optical system. Regarding a plurality of pixels 211 within a predetermined area arranged in the same pixel row, an image organized by combining outputs of the photoelectric conversion units 211a is set as an AF image A, and an image organized by combining outputs of the photoelectric conversion units 211b is set as an AF image B. Outputs of the photoelectric conversion units 211a and 211b use a pseudo-luminance (Y) signal calculated by adding outputs of green, red, blue, and green that are included in a unit array of the color filter. However, the AF images A and B may be organized for each color of red, blue, and green. By detecting, using correlation calculation, a relative image shift amount between the AF images A and B generated as above, a focus shift amount (defocus amount) in a predetermined area can be detected. In the present embodiment, the output of one of the photoelectric conversion units in each pixel and the sum of the outputs of both photoelectric conversion units in the pixel are read out from the image sensor 122. For example, in the case of reading out the output of the photoelectric conversion unit 211a and the sum of the outputs of the photoelectric conversion units 211a and 211b, the output of the photoelectric conversion unit 211b is obtained by subtracting the output of the photoelectric conversion unit 211a from the sum. Both the AF images A and B can thereby be obtained, achieving the phase-difference AF. Since this kind of image sensor is known as disclosed in Japanese Patent Laid-Open No. 2004-134867, a further description of the details thereof will be omitted.

Figure 2B:
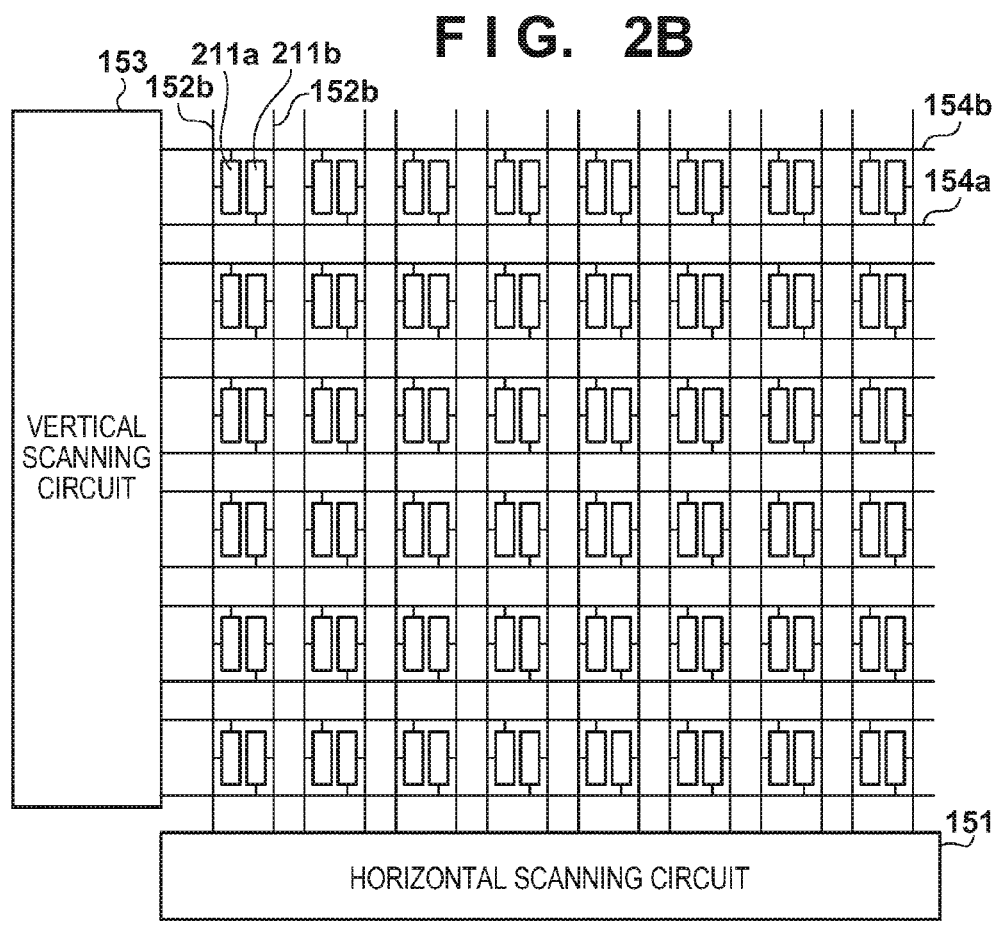

FIG. 2B is a diagram illustrating an exemplary configuration of a readout circuit of the image sensor 122 in the present embodiment. Reference numeral 151 denotes a horizontal scanning circuit, and reference numeral 153 denotes a vertical scanning circuit. Horizontal scan lines 152a and 152b and vertical scan lines 154a and 154b are arranged at boundary portions of each pixel, and a signal of each photoelectric conversion unit is read out to the outside via these scan lines.

Note that the image sensor 122 in the present embodiment has the following two kinds of readout mode in addition to the above-described method for reading out each pixel. A first readout mode is called an "all-pixel readout mode", which is a mode for capturing a fine still image. In this case, signals of all pixels are read out.

A second readout mode is called a "thinning readout mode", which is a mode for recording a moving image or only displaying a preview image. Since the necessary number of pixels in this case is smaller than the number of all pixels, only pixels in the pixel group that are left after the thinning at a predetermined ratio in both the X and Y directions are read out. The thinning readout mode is also used similarly in the case where high-speed readout is necessary. When thinning pixels in the X direction, signals are added to achieve an improvement in the S/N ratio, and when thinning pixels in the Y direction, signal outputs in thinned rows are ignored. The phase-difference AF and the contrast AF are also usually performed based on signals read out in the second readout mode.

Figure 3A:
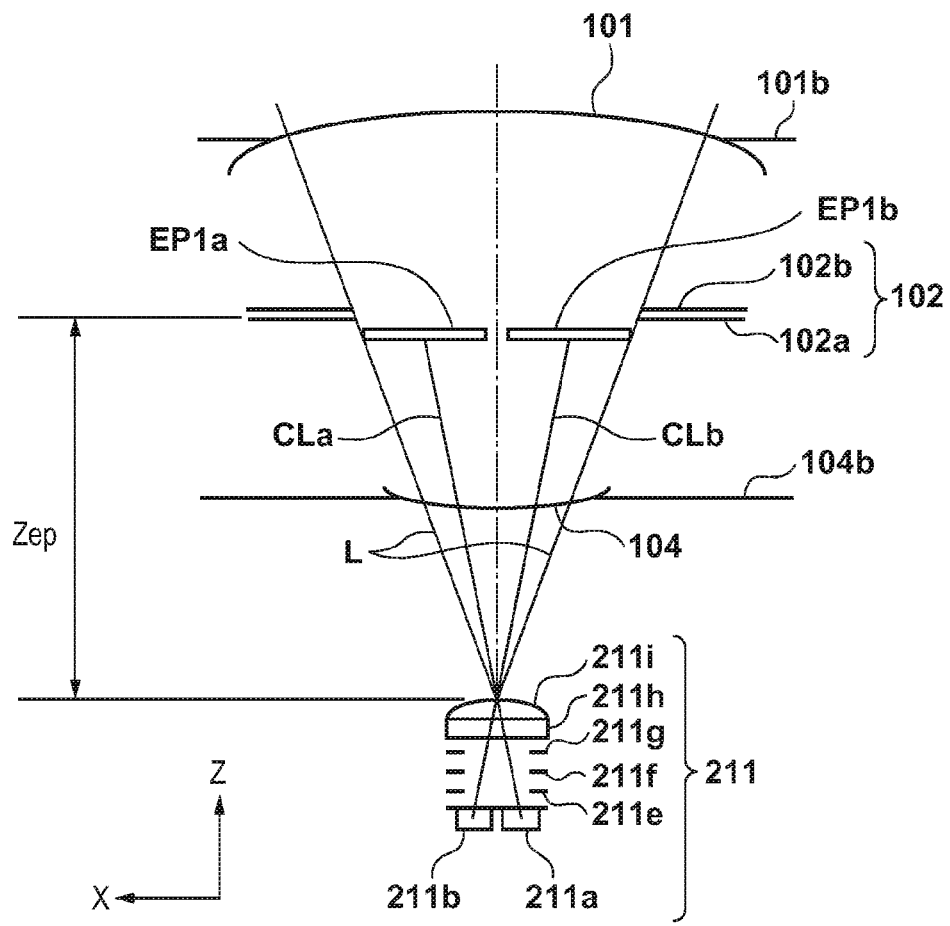
FIGS. 3A and 3B are diagrams illustrating a relationship between an exit pupil and photoelectric conversion areas according to the embodiment.
Figure 3B:
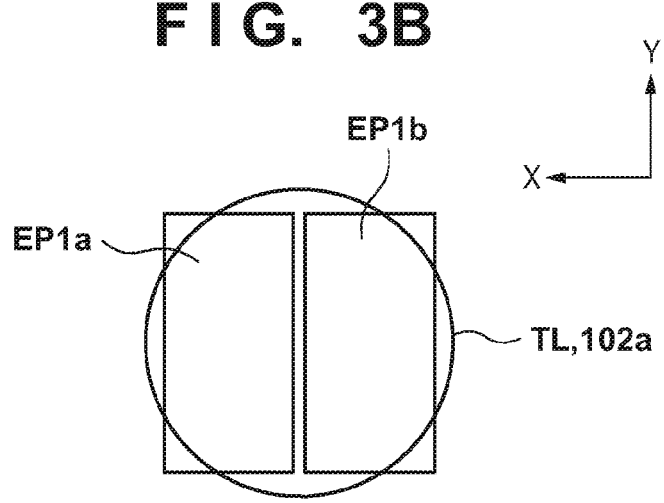

FIGS. 3A and 3B are diagrams illustrating a conjugate relationship between the exit pupil plane of the imaging optical system and the photoelectric conversion units in the image sensor arranged at an image height of 0, i.e., near the center of an image surface in the image capturing apparatus in the present embodiment. The photoelectric conversion units in the image sensor and the exit pupil plane of the imaging optical system are designed so as to have a conjugate relationship through the on-chip microlens. In general, the exit pupil of the imaging optical system roughly coincides with a plane on which an iris diaphragm for adjusting the amount of light is placed. On the other hand, the imaging optical system in the present embodiment is a zoom lens having a magnification changing function. Depending on the optical type, the distance of the exit pupil from the image surface or the size of the exit pupil changes when performing a magnification changing operation. FIG. 3A illustrates a state where the focal length of the lens unit 100 is at the center between a wide-angle end and a telephoto end. Optimum design of the shape of the on-chip microlens and an eccentricity parameter suitable for the image height (X and Y coordinates) is achieved with the exit pupil distance Zep in this state as a standard value.

In FIG. 3A, reference numeral 101 denotes the first lens group, reference numeral 101b denotes a lens barrel member that holds the first lens group, and reference numeral 104b denotes a lens barrel member that holds the focus lens 104. Reference numeral 102 denotes the diaphragm-shutter, reference numeral 102a denotes an aperture plate that defines the aperture when the diaphragm is opened, and reference numeral 102b denotes diaphragm blades for adjusting the aperture when the diaphragm is narrowed. Note that reference numerals 101b, 102a, 102b, and 104b, which work as members for limiting light beams passing through the imaging optical system, denote an optical virtual image as observed from the image surface. A synthetic opening near the diaphragm-shutter 102 is defined as the exit pupil of the lens, and the distance thereof from the image surface is Zep, as mentioned above.

The pixel 211 is arranged near the center of the image surface, and will be called a "center pixel" in the present embodiment. The center pixel 211 is constituted, from the lowermost layer, the photoelectric conversion units 211a and 211b, interconnect layers 211e to 211g, a color filter 211h, and the on-chip microlens 211i. The two photoelectric conversion units 211a and 211b are projected to the exit pupil plane of the imaging optical system by the on-chip microlens 211i. In other words, the exit pupil of the imaging optical system is projected to a surface of the photoelectric conversion units via the on-chip microlens 211i.

FIG. 3B illustrates projected images of the photoelectric conversion units on the exit pupil plane of the imaging optical system, and the projected images corresponding to the photoelectric conversion units 211a and 211b are denoted respectively by EP1a and EP1b. In the present embodiment, the image sensor 122 has a pixel from which both an output of one of the two photoelectric conversion units 211a and 211b and the output of the sum of the outputs of both photoelectric conversion units can be obtained. The output of the sum of the outputs from both photoelectric conversion units is obtained by performing photoelectric conversion on light beams that have passed through both areas of the projected images EP1a and EP1b, which roughly cover the entire pupil region of the imaging optical system, and thus, a value corresponding to a flux that corresponds to an overlapping area of an area TL and the projected images EP1a and EP1b in FIG. 3B.

In FIG. 3A, where sign L denotes outermost portions of the light beams passing through the imaging optical system, the light beam L is restricted by the aperture plate 102a of the diaphragm, and vignetting substantially does not occur in the projected images EP1a and EP1b in the imaging optical system. In FIG. 3B, the light beam L in FIG. 3A is denoted by TL. It can be found that vignetting substantially does not occur, also from the fact that most parts of the projected images EP1a and EP1b of the photoelectric conversion units are included within the circle denoted by TL. Since the light beam L is limited only by the aperture plate 102a of the diaphragm, TL can be replaced with 102a. At this time, vignetting states of the projected images EP1a and EP1b are symmetrical with respect to the optical axis at the image surface center, and the amounts of light received by the photoelectric conversion units 211a and 211b are equal to each other.

In the case of performing the phase-difference AF, the camera MPU 125 controls the image sensor drive circuit 123 so as to read out the aforementioned two kinds of output from the image sensor 122. The camera MPU 125 then gives the image processing circuit 124 information about the focus detection region, and gives the image processing circuit 124 an instruction to generate data of the AF images A and B from the outputs of the pixels included in the focus detection region and supplies the data to the on-imaging plane phase-difference focus detection unit 129. The image processing circuit 124 generates the data of the AF images A and B and outputs the data to the on-imaging plane phase-difference focus detection unit 129 in accordance with the command. The image processing circuit 124 also supplies RAW image data to the TVAF focus detection unit 130.

As described above, the image sensor 122 constitutes a part of the focus detection apparatus regarding both the phase-difference AF and the contrast AF.

Note that, although an exemplary configuration has been described here in which the exit pupil is horizontally divided into two portions, some pixels in the image sensor 122 may have a configuration in which the exit pupil is vertically divided into two portions. A configuration is also possible in which the exit pupil is divided both horizontally and vertically. As a result of providing a pixel in which the exit pupil is vertically divided, phase-difference AF is enabled that can handle both the horizontal contrast and the vertical contrast of a subject.

Description of Focus Detection Operation: Contrast AF

Figure 4:
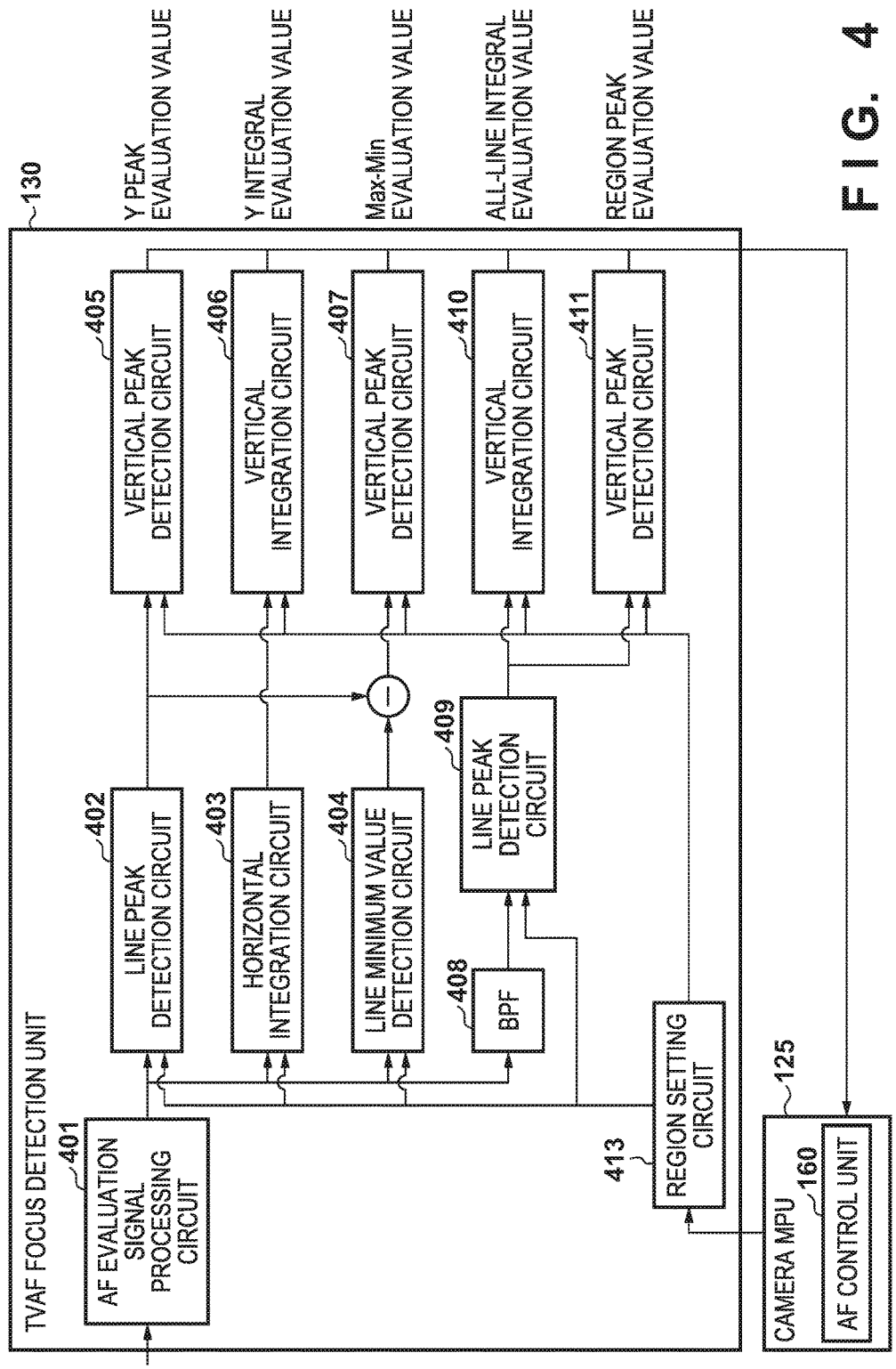
FIG. 4 is a block diagram illustrating a structure of a TV-AF focus detector shown in FIG. 1 according to the embodiment.

Next, the contrast AF (TVAF) will be described using FIG. 4. The contrast AF is achieved by the camera MPU 125 and the TVAF focus detection unit 130 repeatedly performing the driving of the focus lens 104 and evaluation value calculation in conjunction with each other.

Upon the RAW image data being input from the image processing circuit 124 to the TVAF focus detection unit 130, an AF evaluation signal processing circuit 401 extracts a green (G) signal from Bayer pattern signals, and performs gamma correction processing for enhancing low luminance components and suppressing high luminance components. Although the present embodiment will describe a case of performing the TVAF using a green (G) signal, all signals of red (R), blue (B), and green (G) may be used. A luminance (Y) signal may be generated using all RGB colors. In the following description, an output signal generated by the AF evaluation signal processing circuit 401 will be called a "luminance signal Y" regardless of the type of a signal to be used.

Note that it is assumed that the focus detection region is set in a region setting circuit 413 by the camera MPU 125. The region setting circuit 413 generates a gate signal for selecting a signal within the set region. The gate signal is input to a line peak detection circuit 402, a horizontal integration circuit 403, a line minimum value detection circuit 404, a line peak detection circuit 409, vertical integration circuits 406 and 410, and vertical peak detection circuits 405, 407, and 411. Also, a timing of the luminance signal Y being input to each circuit is controlled such that each focus evaluation value is generated with the luminance signal Y within the focus detection region. Note that a plurality of regions can be set in the region setting circuit 413 in accordance with the focus detection region.

A method for calculating a Y peak evaluation value will now be described. The luminance signal Y that has been subjected to gamma correction is input to the line peak detection circuit 402, and a Y line peak value of each horizontal line is obtained within the focus detection region that is set in the region setting circuit 413. A peak of the output of the line peak detection circuit 402 is held in the vertical direction within the focus detection region by the vertical peak detection circuit 405, and a Y peak evaluation value is generated. The Y peak evaluation value is an index that is effective in determination of a high-luminance subject and a low-luminance subject.

A method for calculating a Y integral evaluation value will now be described. The luminance signal Y that has been subjected to gamma correction is input to the horizontal integration circuit 403, and a Y integral value is obtained in each horizontal line within the focus detection region. Furthermore, the output of the horizontal integration circuit 403 is integrated in the vertical direction within the focus detection region by the vertical integration circuit 406, and a Y integral evaluation value is generated. The Y integral evaluation value can be used as an index for determining the brightness of the entire focus detection region.

A method for calculating a Max-Min evaluation value will be described. The luminance signal Y that has been subjected to gamma correction is input to the line peak detection circuit 402, and a Y line peak value of each horizontal line is obtained within the focus detection region. The luminance signal Y that has been subjected to gamma correction is also input to the line minimum value detection circuit 404, and a minimum value of Y is detected in each horizontal line within the focus detection region. The detected line peak value and smallest value of Y in each horizontal line are input to a subtractor, and (line peak value-minimum value) is input to the vertical peak detection circuit 407. The vertical peak detection circuit 407 holds the peak in the vertical direction within the focus detection region, and generates a Max-Min evaluation value. The Max-Min evaluation value is an index that is effective for determination of low contrast and high contrast.

A method for calculating a region peak evaluation value will now be described. By passing the luminance signal Y that has been subjected to gamma correction through a BPF 408, specific frequency components are extracted and a focus signal is generated. This focus signal is input to the line peak detection circuit 409, and a line peak value in each horizontal line is obtained within the focus detection region. The line peak value is held as a peak in the focus detection region by the vertical peak detection circuit 411, and a region peak evaluation value is generated. The region peak evaluation value varies only a little even if a subject moves within the focus detection region, and accordingly is an index that is effective for restart determination, i.e., determination of whether to transition to processing for finding an in-focus point again from an in-focus state.

A method for calculating an all-line integral evaluation value will now be described. As with the region peak evaluation value, the line peak detection circuit 409 obtains a line peak value in each horizontal line within the focus detection region. Next, the line peak detection circuit 409 inputs the line peak value to the vertical integration circuit 410, and integrates, in the vertical direction, the line peak value with respect to the number of all horizontal scan lines within the focus detection region to generate an all-line integral evaluation value. A high-frequency all-line integral evaluation value, which has a wide dynamic range and a high sensitivity due to the effect of integration, is a main AF evaluation value. Accordingly, in the present embodiment, when a "focus evaluation value" is simply recited, it means the all-line integral evaluation value.

An AF control unit 160 in the camera MPU 125 obtains the aforementioned respective focus evaluation values, and moves the focus lens 104 in a predetermined direction along the optical axis direction by a predetermined amount through the lens MPU 117. The AF control unit then calculates the aforementioned various evaluation values based on a newly obtained image data, and detects a focus lens position at which the all-line integral evaluation value is largest. Then, The AF control unit detects the difference between the current focus lens position and the focus lens position at which the all-line integral evaluation value is largest as a focus shift amount (defocus amount).

In the present embodiment, various AF evaluation values are calculated in the horizontal line direction and the vertical line direction. Focus detection can thereby be performed with respect to subject contrast information in two perpendicular directions, namely the horizontal and vertical directions.

Description of Focus Detection Region

Figure 5:
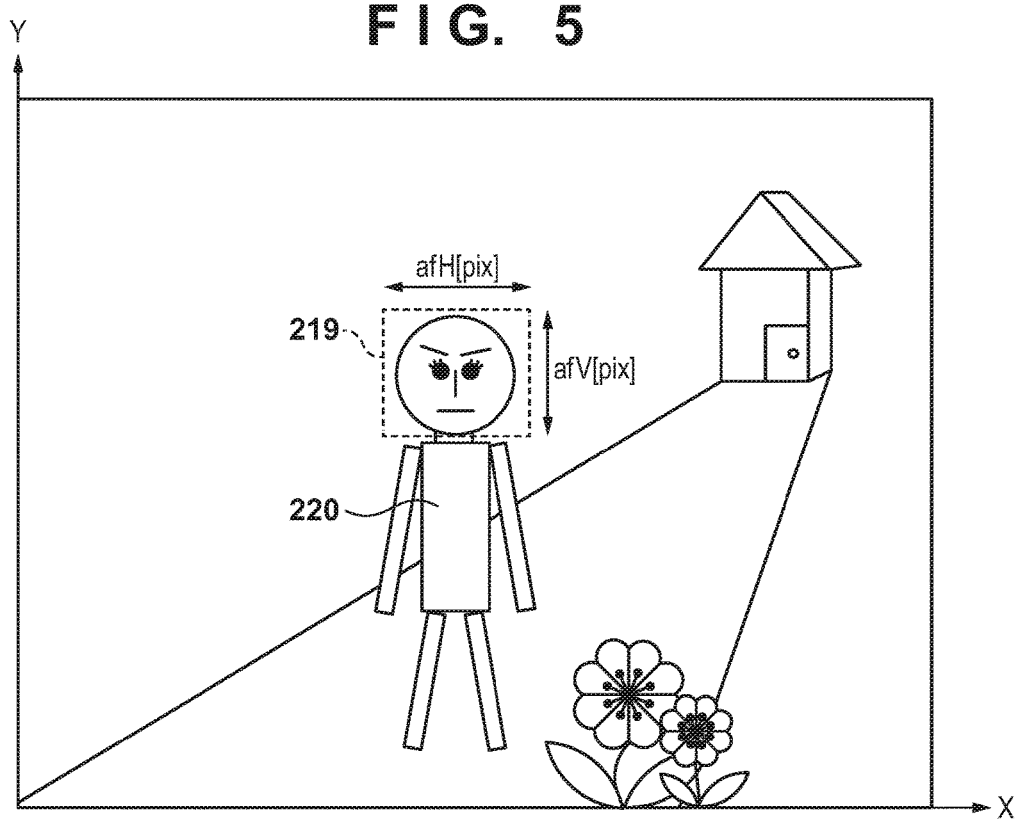
FIG. 5 is a diagram illustrating an example of focus detection areas according to the embodiment.

FIG. 5 is a diagram illustrating an exemplary focus detection region within an imaging area. As mentioned above, both the phase-difference AF and the contrast AF are performed based on signals obtained from the pixels included in the focus detection region. In FIG. 5, a rectangle denoted by dotted lines is a focus detection region 219 in which the pixels of the image sensor 122 are formed. In the example of FIG. 5, the focus detection region 219 includes afH pixels in the horizontal direction and afV pixels in the vertical direction. Although FIG. 5 illustrates an example when a focus detection region is set using a result of face detection, a focus detection region may be set so as to include a main subject 220, or may be set to an area a user has set in advance. Note that FIG. 5 illustrates an exemplary setting of the focus detection region, and the number, position, and size of the focus detection region are not limited to those shown in FIG. 5.

Description of Flow of Focus Detection Processing

Next, automatic focus detection (AF) operations in the digital camera according to the present embodiment will be described with reference to FIGS. 6A to 6C. The AF processing operations described hereinafter are assumed to be executed by the camera MPU 125 unless otherwise noted. Additionally, driving and control of the lens unit 100 realized by the camera MPU 125 sending commands and the like to the lens MPU 117 may be described as being executed by the camera MPU 125 for the sake of simplicity.

Figure 6A:
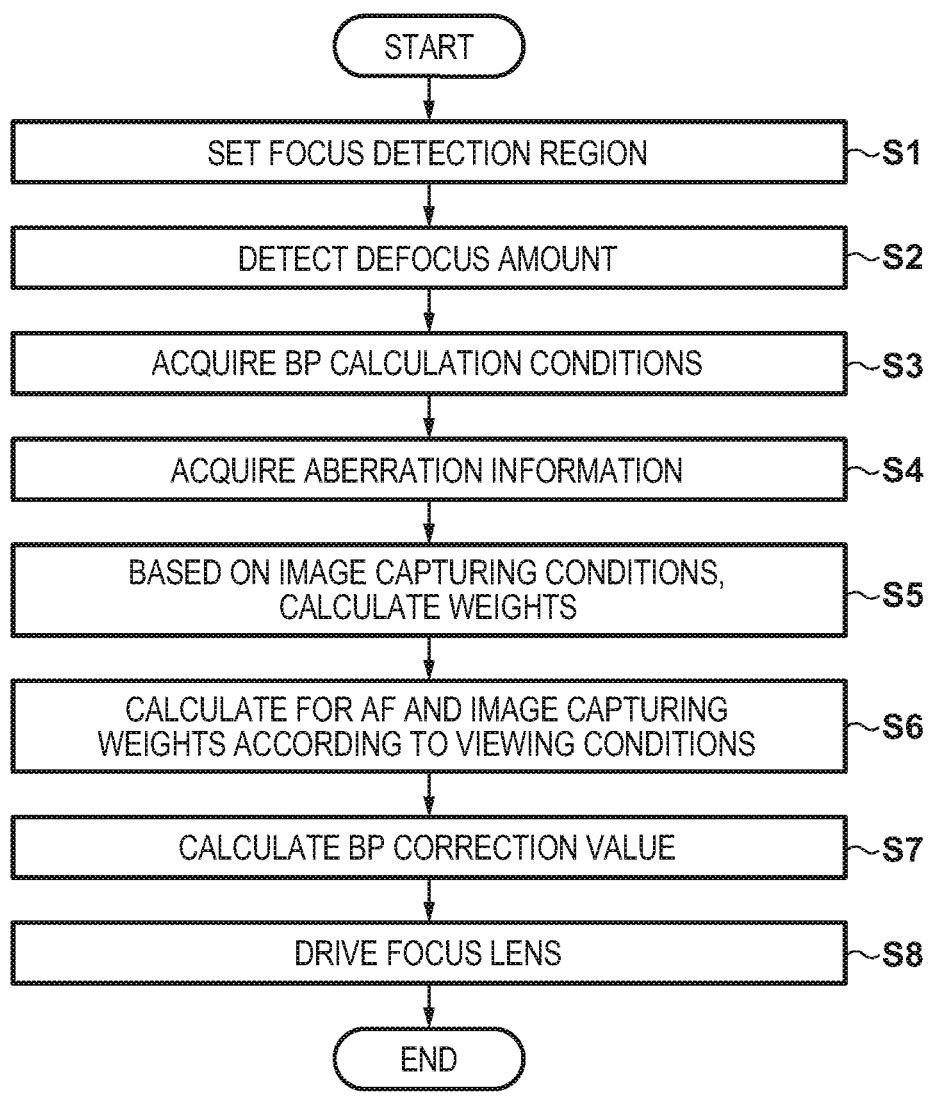

FIG. 6A is a flowchart illustrating the flow of AF processing according to the present embodiment. First, in step S1, the camera MPU 125 sets the focus detection region. The focus detection region 219 set here may be determined on the basis of the main subject 220 as indicated in FIG. 5, or may be a focus detection region set in advance. Here, coordinates (x1, y1) representing the focus detection region 219 are set for the focus detection region. The representative coordinates (x1, y1) at this time may be a barycenter of the focus detection region 219, for example.

In step S2, the focus shift amount (defocus amount) is detected. In the present embodiment, the camera MPU 125 finds a defocus amount DEF suited to phase-difference AF or contrast AF in the focus detection region set in step S1.

In step S3, the camera MPU 125 obtains parameters (calculation conditions) necessary for calculating a best focus (BP) correction value. The BP correction value changes in response to changes in the imaging optical system, changes in a focus detection optical system, and so on, such as the position of the focus lens 104, the position of the first lens group 101, which corresponds to the zoom state, and positional coordinates of the focus detection region (x1,y1). Accordingly, the camera MPU 125 acquires information such as the position of the focus lens 104, the position of the first lens group 101, which corresponds to the zoom state, and the positional coordinates of the focus detection region (x1, y1), for example.

Next, in step S4, the aberration information is acquired. Here, the aberration information is information indicating an aberration state of the optical system, and is information regarding an image forming position of the imaging optical system for each color, direction, and spatial frequency of the subject, for example.

Figure 7A:
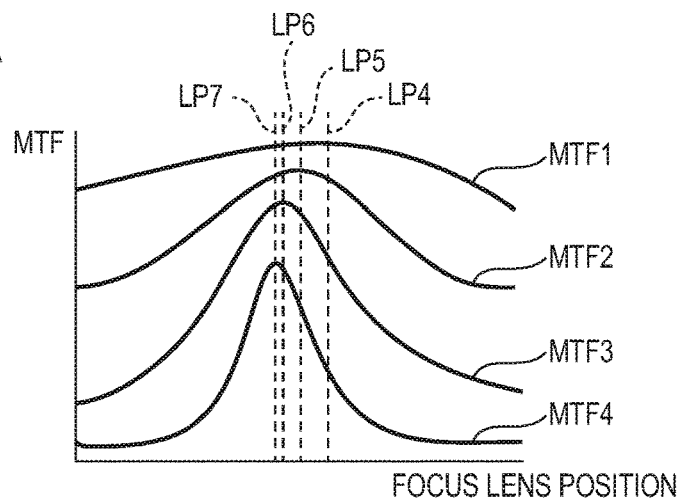
FIGS. 7A to 7C are diagrams illustrating examples of aberration information according to the embodiment.

First, an example of the aberration information for each spatial frequency stored in the lens memory 118 will be described using FIGS. 7A and 7B. FIG. 7A is a graph illustrating a defocus MTF of the imaging optical system. The horizontal axis represents the position of the focus lens 104, and the vertical axis represents the strength of MTF. The four curves indicated in FIG. 7A are MTF curves for each spatial frequency, with an MTF curve at a spatial frequency F1 (lp/mm) corresponding to MTF1, and MTF curves at spatial frequencies F2, F3, and F4 (lp/mm) similarly corresponding to MTF2, MTF3, and MTF4, respectively. The spatial frequency increases in order of F1, F2, F3, and F4. Meanwhile, LP4, LP5, LP6, and LP7 indicate positions of the focus lens 104 corresponding to maximum values of the curves of the defocus MTF1, MTF2, MTF3, and MTF4, respectively.

Figure 7B:
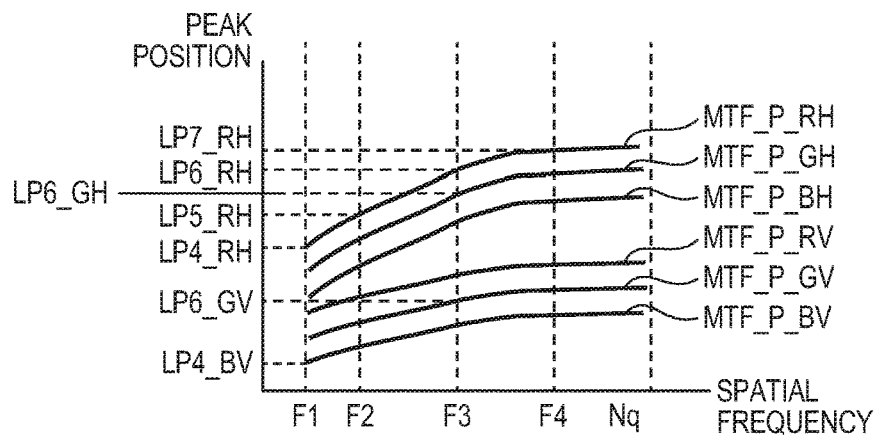

FIG. 7B illustrates the position of the focus lens 104, indicating the maximum value of the defocus MTF indicated in FIG. 7A, for each of six combinations of the above-described colors (R, G, and B) and directions (horizontal and vertical). For example, in FIG. 7B, a curve MTF_P_RH expresses position information of the focus lens 104 that indicates the maximum value at each spatial frequency of the defocus MTF for red (R) and the horizontal direction (H). The same is indicated for the colors aside from red (R), namely G and B, and the vertical direction (V). In the case of the combination of red (R) and the horizontal direction (H), for example, the curve shown in FIG. 7B is expressed by the following Formula (1), which takes a spatial frequency f and positional coordinates (x,y) of the focus detection region on the image sensor 122 as variables. In Formula (1), rh(n) (where n=0 to 8) is a coefficient, and is the aberration information in the present embodiment.

$$MTF\_P\_RH(f,x,y) = (rh(0) \times x + rh(1) \times y + rh(2)) \times f^2 + (rh(3) \times x + rh(4) \times y + rh(5)) \times f + (rh(6) \times x + rh(7) \times y + rh(8)) \qquad (1)$$

The other combinations of colors and directions can also be expressed by formulas similar to Formula (1) by changing the coefficient. Additionally, in the present embodiment, rh(n) (where n=0 to 8) is assumed to be stored in the lens memory 118 of the lens unit 100 in advance, and the camera MPU 125 acquires rh(n) (where n=0 to 8) by a request made to the lens MPU 117. However, rh(n) (where n=0 to 8) may be stored in a nonvolatile region of the camera RAM 125b.

Coefficients rv, gh, gv, bh, and bv for combinations of red and vertical (MTF_P_RV), green and horizontal (MTF_P_GH), green and vertical (MTF_P_GV), blue and horizontal (MTF_P_BH), and blue and vertical (MTF_P_BV) are stored and acquired in the same manner. By expressing the aberration information by a function and storing the coefficients of the respective terms also as aberration information, aberration information corresponding to changes in the imaging optical system, changes in the focus detection optical system, and so on can be stored while reducing the amount of data stored in the lens memory 118, the camera RAM 125b, and so on.

Next, in step S5, weights are set for AF and image capturing based on the image capturing conditions among the signals obtained from the image sensor 122. The "image capturing conditions" are conditions in effect when the user shoots an image, and vary depending upon the resolution of the captured image, the subject, the imaging optical system, frequency characteristics of image processing, and so on, for example. The operations will be described in detail later using FIG. 6B, but as the result of the operations carried out in step S5, focus detection and setting of first and second weighting information pertaining to the captured image are performed, as indicated in FIG. 8A. The weights for AF and image capturing are information indicating the magnitude of weights on each combination of contrast direction (horizontal and vertical) for evaluating the focus state, color (R, G, or B), and spatial frequency.

Next, in step S6, weights are calculated for parameters based on viewing conditions among the signals obtained from the image sensor 122. The "viewing conditions" are conditions in effect when the user views the captured image, and vary depending upon the size, resolution, and display ratio of a monitor when viewing the captured image through the monitor, a viewing distance (that is, the distance between the user and the monitor), and so on, for example. The operations will be described in detail later using FIG. 6C, but weighting coefficients K_IMG_fq1 to K_IMG_fq4 for the frequency settings of the captured image, indicated in FIG. 8B, are updated in step S6. The weighting coefficients corresponding to the aberration state of the imaging optical system when viewing the captured image calculated up to step S6 (that is, K_IMG_H and K_IMG_V, K_IMG_R and K_IMG_G, K_IMG_B, and K_IMG_fq1 to K_IMG_fq4) form the first weighting information. Additionally, weighting coefficients corresponding to the aberration state of the imaging optical system when carrying out focus detection (that is, K_AF_H and K_AF_V, K_AF_R and K_AF_G, K_AF_B, and K_AF_fq1 to K_AF_fq4) form the second weighting information.

Next, in step S7, the camera MPU 125 calculates the BP correction value from the weighting coefficients set up to step S6 and the aberration information acquired in step S4.

The operations will be described in detail below. First, for the combination of red (R) and the horizontal direction (H), the location information (x,y) of the focus detection region, acquired in step S3, is substituted for x,y in Formula (1). As a result, Formula (1) can be expressed as the following Formula (2).

$$MTF\_P\_RH(f) = Arh \times f^2 + Brh \times f + Crh \quad (2)$$

The camera MPU 125 carries out similar calculations for the aberration information MTF_P_RV(f), MTF_P_GH(f), MTF_P_GV(f), MTF_P_BH(f), and MTF_P_BV(f) for the other colors and directions as well.

FIG. 7B illustrates examples of the aberration information after the location information of the focus detection region set in step S1 has been substituted. The horizontal axis represents the spatial frequency, whereas the vertical axis represents the position of the focus lens 104 indicating the maximum value of the defocus MTF (a peak position). As illustrated, the curves of different colors diverge in cases of high chromatic aberration, and the curves of the horizontal direction and the vertical direction diverge in cases of high vertical/horizontal differences. In this manner, in the present embodiment, defocus MTF information corresponding to the spatial frequency is present for each combination of color (R, G, and B) and evaluation direction (H and V).

Next, the camera MPU 125 weights the aberration information with the weighting coefficients for the directions, colors, and frequencies pertaining to the focus detection and captured image calculated up to S6 (see FIG. 8A). As a result, the aberration information is weighted with respect to the colors and directions to be evaluated in the focus detection and for the captured image, and the aberration state arising when viewing the captured image and the aberration state arising when carrying out focus detection can be obtained. Specifically, the camera MPU 125 calculates spatial frequency characteristics MTF_P_AF(f) for focus detection and spatial frequency characteristics MTF_P_IMG(f) for the captured image using Formulas (3) and (4).

$$\begin{aligned}MTF\_P\_AF(f) = &K\_AF\_R \times K\_AF\_H \times MTF\_P\_RH(f) + \\ &K\_AF\_R \times K\_AF\_V \times MTF\_P\_RV(f) + K\_AF\_G \times \\ &K\_AF\_H \times MTF\_P\_GH(f) + K\_AF\_G \times K\_AF\_V \times \\ &MTF\_P\_GV(f) + K\_AF\_B \times K\_AF\_H \times MTF\_P\_BH \\ &(f) + K\_AF\_B \times K\_AF\_V \times MTF\_P\_BV(f)\end{aligned} \quad (3)$$

$$\begin{aligned}MTF\_P\_IMG(f) = &K\_IMG\_R \times K\_IMG\_H \times MTF\_P\_RH \\ &(f) + K\_IMG\_R \times K\_IMG\_V \times MTF\_P\_RV(f) + \\ &K\_IMG\_G \times K\_IMG\_H \times MTF\_P\_GH(f) + \\ &K\_IMG\_G \times K\_IMG\_V \times MTF\_P\_GV(f) + \\ &K\_IMG\_B \times K\_IMG\_H \times MTF\_P\_BH(f) + \\ &K\_IMG\_B \times K\_IMG\_V \times MTF\_P\_BV(f)\end{aligned} \quad (4)$$

Figure 7C:
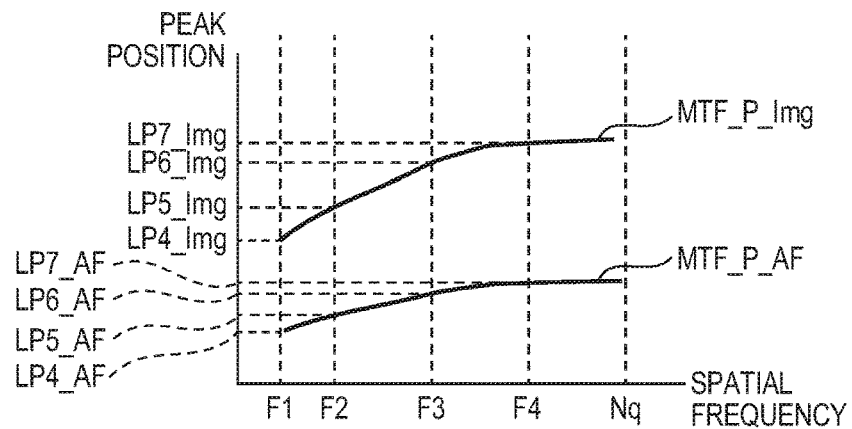

FIG. 7C indicates focus lens positions (peak positions) LP4_AF, LP5_AF, LP6_AF, and LP7_AF where the defocus MTF obtained through the substitution in Formula (3) peaks (is at a maximum value), for discrete spatial frequencies F1 to F4. FIG. 7C also indicates focus lens positions (peak positions) LP4_Img, LP5_Img, LP6_Img, and LP7_Img where the defocus MTF obtained through the substitution in Formula (4) peaks (is at a maximum value), for the discrete spatial frequencies F1 to F4.

Next, the camera MPU 125 calculates the in-focus position (P_img) of the captured image and the in-focus position (P_AF) detected by the AF, according to the following Formulas (5) and (6). The defocus MTF information MTF_P (n) obtained from the above-described Formulas (3) and (4) and the evaluation bands K_IMG_fq and K_AF_fq obtained in step S6 are used in this calculation.

$$\begin{aligned}P\_img = &MTF\_P\_IMG(1) \times K\_IMG\_fq(1) + \\ &MTF\_P\_IMG(2) \times K\_IMG\_fq(2) + \\ &MTF\_P\_IMG(3) \times K\_IMG\_fq(3) + \\ &MTF\_P\_IMG(4) \times K\_IMG\_fq(4)\end{aligned} \quad (5)$$

$$\begin{aligned}P\_AF = &MTF\_P\_AF(1) \times K\_AF\_FQ(1) + MTF\_P\_AF(2) \times K\_AF\_FQ(2) + \\ &MTF\_P\_AF(3) \times K\_AF\_FQ(3) + MTF\_P\_AF(4) \times K\_AF\_FQ(4)\end{aligned} \quad (6)$$

In other words, the camera MPU 125 weights the maximum value information K_P_IMG(n) and K_P_AF(n) of the defocus MTF for each spatial frequency indicated in FIG. 7C with the captured image and AF evaluation bands K_IMG_fq and K_AF_fq, and add the weighted results, thereby obtaining the in-focus position (P_img) of the captured image and the in-focus position (P_AF) detected by the AF.

Next, the camera MPU 125 calculates the BP correction value (BP) through the following Formula (7).

$$BP = P\_AF - P\_img \quad (7)$$

Next, in step S8, a focus lens drive amount M is found through Formula (8), using the defocus amount DEF obtained in step S2 and the BP correction value BP obtained in step S7.

$$M = DEF + BP \quad (8)$$

The camera MPU 125 obtains a focused image matching the user's intentions by driving the focus lens in the optical axis direction by the focus lens drive amount M.

Next, a method for calculating the weighting coefficients for the AF and the captured image based on the image capturing conditions will be described in detail using FIGS. 9A to 9F, with reference to the flowchart illustrated in FIG. 6B. FIGS. 9A to 9F indicate strengths for each spatial frequency, with the horizontal axis representing the spatial frequency and the vertical axis representing the strength.

In step S11, first, the focus detection (AF) weighting coefficients based on the color and direction in the captured image are set. Here, weighting coefficients K_AF_R, K_AF_G, and K_AF_B for the colors during focus detection (AF) and weighting coefficients K_IMG_R, K_IMG_G, and K_IMG_B for the colors in the captured image are set, as indicated in FIG. 8A. Furthermore, coefficient values are set for the directional weighting coefficients K_AF_H and K_AF_V during focus detection (AF) and the directional weighting coefficients K_IMG_H and K_IMG_V in the captured image. A representative setting method will be described hereinafter. With respect to the directional weighting coefficients K_AF_H, K_AF_V, K_IMG_H, and K_IMG_V, for example, the following settings may be made in the case where the focus detection direction is only the horizontal direction H, with a pupil division form such as that shown in FIG. 2:

$$K\_AF\_H = 1$$

$$K\_AF\_V = 0$$

$$K\_IMG\_H = 1$$

$$K\_IMG\_V = 1$$

This is because the in-focus position obtained through focus detection contributes greatly to aberration by the horizontal direction H, and the in-focus position in the captured image is generally determined as the in-focus position in a captured image having an aberration state in which the horizontal direction H and the vertical direction V are averaged by 1:1.

Next, with respect to the color weighting coefficients K_AF_R, K_AF_G, K_AF_B, K_IMG_R, K_IMG_G, and K_IMG_B, the following settings may be made for a case where, for example, the pixels for focus detection are only the G pixels in the Bayer pattern:

K_AF_R=0

K_AF_G=1

K_AF_B=0

K_IMG_R=0.3

K_IMG_G=0.5

K_IMG_B=0.2

This is because only the G chromatic aberration affects the in-focus position during focus detection, whereas in the captured image, the in-focus position varies under the influence of chromatic aberration of each weighted color resulting from a prescribed white balance coefficient. Although a representative setting method has been described, it is also possible to detect and update the color and direction of the subject, or the settings may be carried out as desired by the user. In addition, although the color division number (R, G, B) is set to 3 and the directional division number (H, V) is set to 2, a greater number of divisions may be made. As the number of divisions increases, the weighting calculation when calculating the BP correction value described earlier becomes complicated, and the processing load on the camera MPU increases. However, this makes it possible to calculate the BP correction value with higher accuracy.

The processing following step S12 is a method for calculating the weighting coefficients K_AF_fq1 to K_AF_fq4 and K_IMG_fq1 to K_IMG_fq4 for the spatial frequencies.

First, in step S12, recording resolution frequency characteristics of the captured image are acquired. Here, the Nyquist frequency of the captured image is acquired. Captured image components exceeding the Nyquist frequency cannot be recorded in a picture. For example, as described above, the image sensor 122 of the present embodiment has two types of readout modes. In the first readout mode, or in other words, in the all-pixel readout mode, the spatial frequency characteristics do not change when the signal is generated, and thus the Nyquist frequency in FIGS. 9A to 9F is Nq. For example, the Nyquist frequency Nq corresponding to a pixel pitch of 4 µm is:

1/(0.004×2)=125 [lp/mm]

On the other hand, in the second readout mode, or in other words, in the thinning readout mode, the spatial frequency characteristics change when the signal is generated. For example, assuming that a ⅓ thinning process is performed in the X direction in the second readout mode, the captured image in the second readout mode has a pixel pitch of 4 µm×3, namely 12 µm. Accordingly, the Nyquist frequency Nq in the second readout mode becomes:

1/(0.012×2)=42 [lp/mm]

Thus the frequency component of the captured image that can be resolved drops. In step S12, a frequency limit [lp/mm] remaining as the captured image is calculated from the pixel pitch of the captured image. In addition, frequency components exceeding the Nyquist frequency causes aliasing (pseudo resolution). Frequency components that cannot be recorded or resolved as captured images or AF images cannot be correctly viewed or used for focus detection, and thus spatial frequency information is obtained from step S13 on, on the basis of the Nyquist frequency of the captured image, and the weights with respect to frequencies for AF and image capturing is calculated. The following descriptions discuss a case where the AF images and captured images have the same Nyquist frequency. However, in the case where the images for AF images and captured images have different pixel pitches, such as the case where the captured image are obtained in the first readout mode and the AF images are obtained in the second readout mode, the calculations are carried out with different Nyquist frequencies set.

Figure 9A:
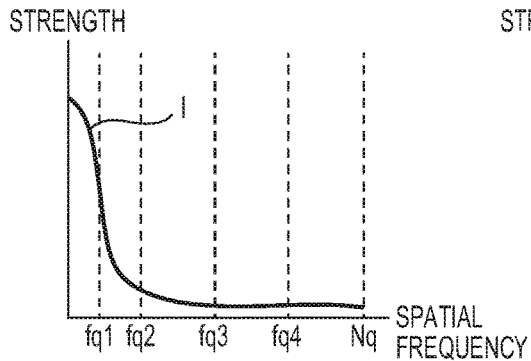
FIGS. 9A to 9F are diagrams illustrating various spatial frequency characteristics depending on image capturing conditions according to the embodiment.

Next, in step S13, spatial frequency characteristics (I) of the subject are acquired. FIG. 9A illustrates an example of the spatial frequency characteristics (I) of the subject. On the horizontal axis, fq1, fq2, fq3, and fq4 represent the spatial frequencies set in FIG. 8B, whereas Nq represents the Nyquist frequency determined by the pixel pitch of the image sensor 122. The spatial frequency fq4 is closer to the Nyquist frequency than fq1, and is thus a higher frequency.

The spatial frequencies fq1, fq2, fq3, fq4, and Nq are indicated in the same manner in FIGS. 9B to 9F described hereinafter. With respect to the spatial frequency characteristics (I) of the subject, in the present embodiment, different subject spatial frequency characteristics are used depending on the subject for which focus detection is carried out. For example, spatial frequency information of the subject such as that indicated in FIG. 9A can be obtained by carrying out a process such as a fast Fourier transform (FFT) on the captured image signal in the focus detection region set in step S1. Although such processing increases the computational processing amount, the processing also enables a correction value based on the subject for which focus detection is carried out to be calculated, which makes highly-accurate focus adjustment possible. For simpler processing, several types of pre-stored spatial frequency characteristics may instead be used in different situations depending on contrast of the subject. Although the subject spatial frequency characteristics (I) are indicated as a curve in FIG. 9A, there are discrete values corresponding to the spatial frequencies fq1, fq2, fq3, and fq4, and these are expressed as I(n) (where 1≤n≤4).

Figure 9B:
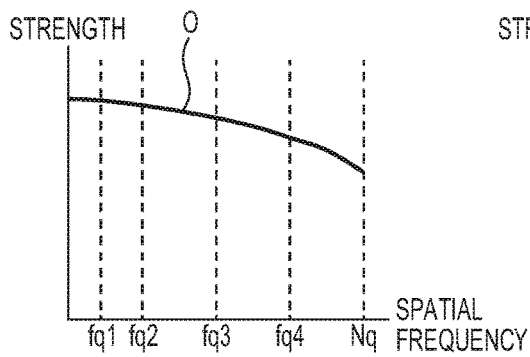

Next, in step S14, frequency characteristics of the imaging optical system are acquired. FIG. 9B illustrates an example of spatial frequency characteristics (O) of the imaging optical system. This optical information may be obtained through the lens MPU 117, or may be stored in the camera RAM 125b. The information stored at this time may be spatial frequency characteristics for each defocus state, or may be spatial frequency characteristics only during an in-focus state. A spatial frequency BP correction value is calculated near an in-focus state, and thus highly-accurate correction can be carried out by using the spatial frequency characteristics during an in-focus state. However, although using the spatial frequency characteristics for each defocus state increases the computational load, doing so also makes more accurate focus adjustment possible. Although the spatial frequency characteristics (O) of the imaging optical system are indicated as a curve in FIG. 9B, there are discrete values corresponding to the spatial frequencies fq1, fq2, fq3, and fq4, and these are expressed as O(n) (where 1≤n≤4).

Figure 9C:
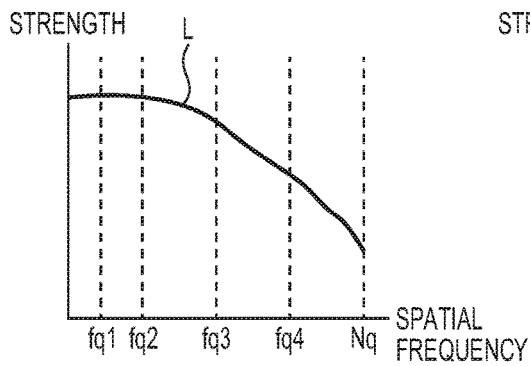

Next, in step S15, the frequency characteristics of the optical LPF 121 of the camera body 120 are acquired. FIG. 9C illustrates an example of spatial frequency characteristics (L) of the optical LPF 121. This information is stored in the camera RAM 125b. Although the spatial frequency characteristics (L) of the optical LPF 121 are indicated as a curve in FIG. 9C, there are discrete values corresponding to the spatial frequencies fq1, fq2, fq3, and fq4, and these are expressed as L(n) (where 1≤n≤4).

Here, from S13 to S15, the subject, imaging optical system, and optical LP (optical low pass) frequency characteristics are acquired individually. Then, in step S18 (described later), spatial frequency characteristics arising when a specific subject is captured by the imaging optical system are acquired by multiplication for each frequency fq(n). However, the method is not limited thereto, and a signal I(n)×O(n)×L(n) may instead be obtained by carrying out a Fourier transform on a captured image signal obtained by actually mounting the lens unit 100 on the camera body 120 and capturing a subject. With this method, the value of I(n)×O(n)×L(n) may be updated each time an image is captured.

Next, in step S16, image processing frequency characteristics are acquired. Here, frequency characteristics changed through an image processing method such as low pass (LP) processing or compressing processing carried out on the captured image are calculated.

Figure 9D:
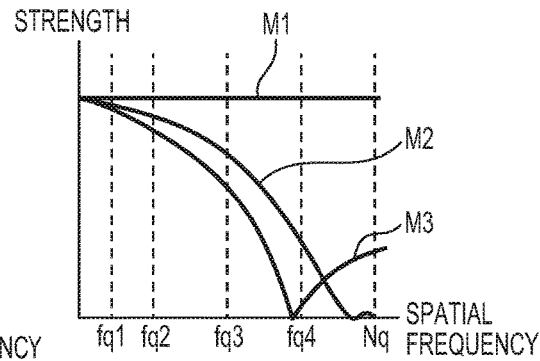

FIG. 9D illustrates an example of spatial frequency characteristics (M1, M2, and M3) obtained when a signal is generated. M1 indicates frequency characteristics in the case where no LP processing or compressing processing is carried out on the captured image. In this case, the spatial frequency characteristics do not change, and thus the coefficient is always set to 1 for each frequency. However, adding a signal to prevent aliasing or improve the S/N ratio can be thought of as processing to be carried out on the image. In this case, the adding produces a low pass filter effect.

Figure 10A:
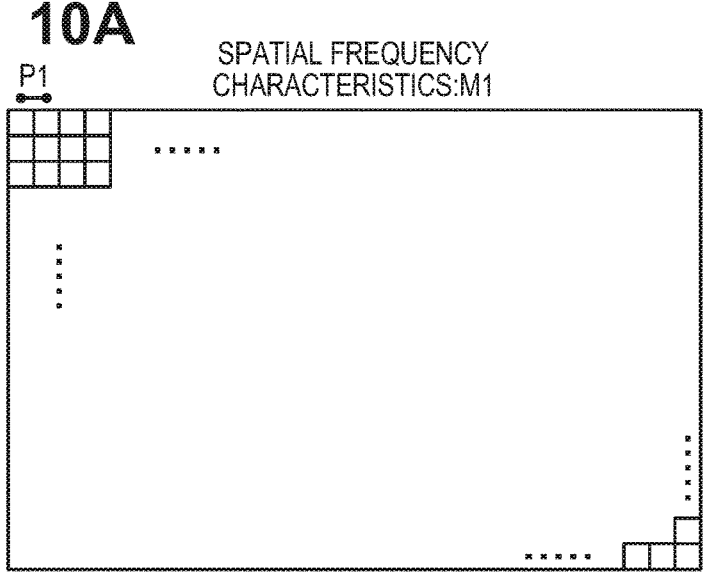
FIGS. 10A to 10C are diagrams for describing adding processing according to the embodiment.
Figure 10B:
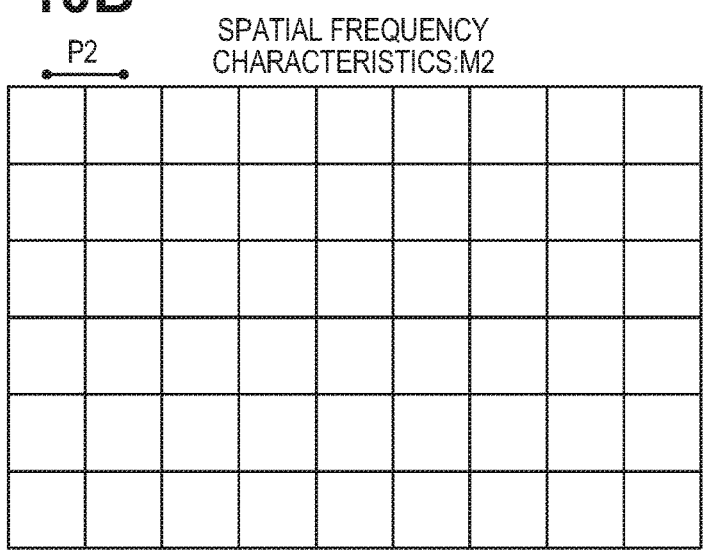
Figure 10C:
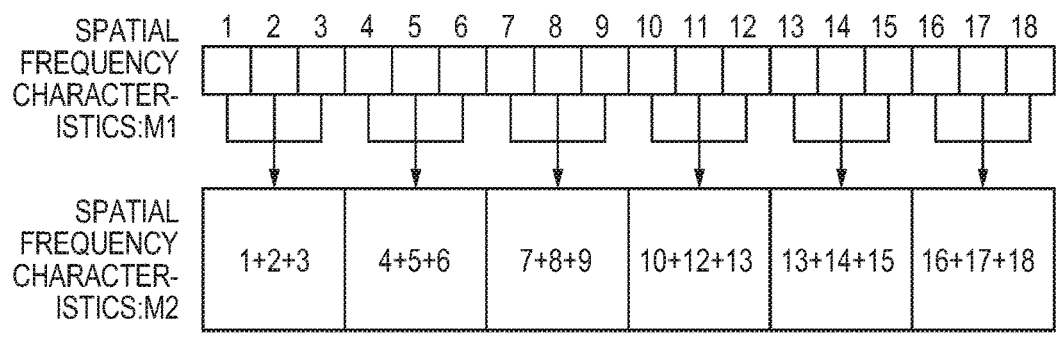

As one example, FIG. 10A is assumed to be a captured image corresponding to M1 in FIG. 9D, whereas FIG. 10B is assumed to be a captured image corresponding to M2. Here, as illustrated in FIG. 10C, it is assumed that a signal corresponding to M1 is added to each pixel in the captured image corresponding to M2, on which LP processing or compression processing has been carried out, such as 1+2+3, 4+5+6, and so on. Furthermore, in addition to the above-described simple adding processing, there are cases of image compression that leaves higher frequencies as well. For example, even in the case where the adding processing carried out by the image sensor drive circuit 123 is processing such as that described above, the image processing circuit 124 may carry out image compression that leaves high frequencies in order to ensure an accurate captured image remains. In this case, a frequency characteristics M corresponding to the LP effect of the image processing may be set. For example, assuming that the LP effect of the image processing circuit 124 is expressed by M3 and the effect of adding by the image sensor drive circuit 123 is expressed by M2, the selected image processing frequency characteristics may be switched between M2 and M3 depending on which circuit the captured image has traversed and what the current recording resolution has become as a result.

Thus in step S16, even if the number of pixels and pixel pitch in the captured image is the same (that is, the Nyquist frequency is the same) in step S15, there are cases where different frequency bands will remain in the captured image depending on the image processing method, and thus the weighting is applied. Note that although the spatial frequency characteristics (M1, M2, and M3) obtained when the signal is generated are expressed as curves in FIG. 9D, there are discrete values corresponding to the spatial frequencies fq1, fq2, fq3, and fq4, and these are expressed as M1($n$), M2($n$), and M3($n$) (where 1≤$n$≤4).

Next, in step S17, frequency characteristics of AF digital processing and representative spatial frequency characteristics when viewing the captured image are acquired. Focus detection is typically carried out while using digital filtering.

Figure 9E:
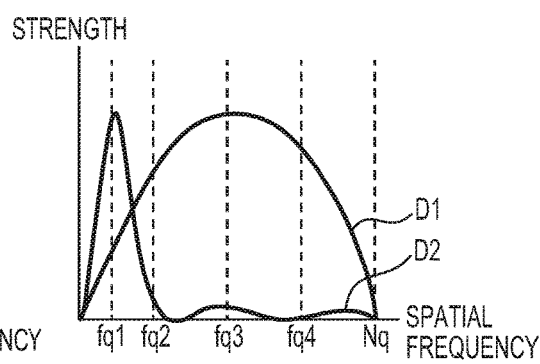

FIG. 9E illustrates spatial frequency characteristics (D1) indicating a sensitivity for each spatial frequency when viewing the captured image, and spatial frequency characteristics (D2) of the digital filter used when processing an AF evaluation signal. The sensitivity for each spatial frequency when viewing the captured image is affected by the size, resolution, and display ratio of the monitor, which is a display unit through which images are viewed, and by the viewing distance. A method for calculating a change amount according to the viewing conditions will be described later using FIG. 6C. Here, the sensitivity for each spatial frequency during viewing is set, and stored, for the following representative conditions, namely a monitor size of A3, a monitor resolution of 1920×1080, a monitor display ratio of 100%, and a viewing distance of 500 mm, for example. Although the spatial frequency characteristics (D1 and D2) when the signal is generated are indicated as curves in FIG. 9E, there are discrete values corresponding to the spatial frequencies fq1, fq2, fq3, and fq4, and these are expressed as D1($n$) and D2($n$) (where 1≤$n$≤4).

Next, in step S18, spatial frequency weighting coefficients for focus detection and captured images are calculated from the characteristic values of the spatial frequencies obtained up to step S17. Calculation of captured image weighting coefficients K_IMG_fq' and AF weighting coefficients K_AF_fq is carried out through the following Formulas (9) and (10).

$$K\_IMG\_fq'(n)=I(n)\times O(n)\times L(n)\times M1(n)\times D1(n)(1\leq n\leq 4) \quad (9)$$

$$K\_AF\_fq(n)=I(n)\times O(n)\times L(n)\times M2(n)\times D2(n)(1\leq n\leq 4) \quad (10)$$

Figure 9F:
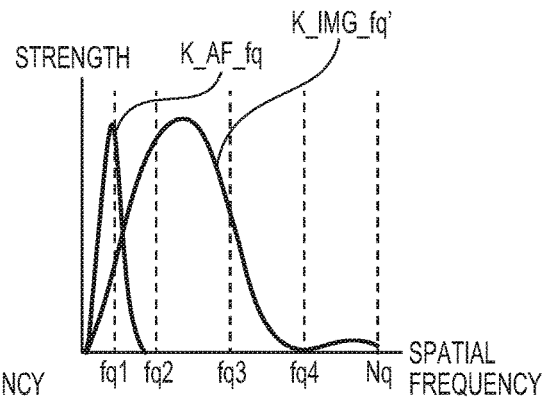

FIG. 9F illustrates the captured image weighting coefficient K_IMG_fq' and the AF weighting coefficient K_AF_fq. By carrying out calculations according to Formulas (9) and (10), it is possible to quantify the degree of influence for each spatial frequency with respect to the factors that determine an in-focus state for the captured image. Likewise, it is possible to quantify the degree of influence error in the focus detection result has for each spatial frequency. Additionally, updating the spatial frequency characteristics (I) in FIG. 9A for each detected subject makes it possible to obtain the weighting coefficients K_IMG_fq and K_AF_fq' corresponding to the spatial frequency characteristics of the subjects.

As described above, when the spatial frequency characteristics of the image processing carried out in step S16 change from M2 to M3, the weighting coefficient may be calculated by replacing M2($n$) in Formula (10) with M3($n$).

Additionally, because it is not necessary to carry out all calculations in the focus detection operations, it is possible to calculate only the spatial frequency characteristics of the imaging optical system and the subject in advance and store those characteristics in the camera, for example. Doing so reduces the amount of data stored, reduces the amount of computations, and so on.

Although FIGS. 9A to 9F illustrate using four spatial frequencies (fq1 to fq4), the spatial frequency characteristics of the captured image and the AF evaluation band can be reproduced with better resolution as the number of spatial frequencies where data is present increases, and thus it is possible to calculate a correction value with high accuracy. Conversely, by reducing the number of spatial frequencies at which weighting is carried out, it is possible to reduce the computational amount. In addition, calculation may be carried out by holding one spatial frequency each representing the spatial frequency characteristics of the captured image evaluation band and the AF evaluation band.

Next, the method for calculating the spatial frequency weighting values of the captured image according to the image capturing conditions will be described in detail using FIGS. 11A to 11H and 12A to 12E, with reference to the flowchart in FIG. 6C.

As described above, in FIG. 6B, weights for spatial frequency is calculated when imaging is performed under the specific viewing conditions of the display unit (for example, a monitor size of A3, a monitor resolution of 1920×1080, a monitor display ratio of 100%, and a viewing distance of 500 mm). In FIG. 6C, a frequency of interest, which varies depending on the user's viewing conditions (monitor size, monitor resolution, monitor display ratio, viewing distance, and so on), can be changed. The parameters pertaining to the viewing conditions (monitor size, monitor resolution, monitor display ratio, viewing distance, and so on) may be input and selectable by the viewer, or may be detected through a method that will be described later.

It is assumed that the image captured by the digital camera is formed at 5×5 [pix], as illustrated in FIG. 11A. FIG. 11B illustrates an image obtained under the specific viewing conditions indicated in FIG. 6B at this time. FIG. 11B illustrates an example when the image captured by the digital camera is displayed in a monitor, and illustrates an example in which the display unit has a monitor size of Z1, a monitor resolution of R1, and a display ratio of B1, with a viewing distance of E1. The monitor size of the display unit indicates the size of a display part of the monitor (M_H [mm]×M_V [mm]). At present, there are various monitor sizes, from 17-inch monitors to 4K-compliant large screens, and here the weights for spatial frequency corresponds to changes in the user's viewing frequency when the size of the display part changes.

Next, the monitor resolution of the display part indicates the total number of pixels in the monitor (P_H [pix]×P_V [pix]). When comparing identical monitor sizes, higher numbers of pixels make it possible to perform display in higher definitions. If the above-described monitor size M_H [mm]×M_V [mm] and the size of a single pixel in the monitor MP [mm] are known, the following can be found:

$$P\_H \text{ [pix]} = M\_H \text{ [mm]}/MP \text{ [mm]}$$

$$P\_V \text{ [pix]} = M\_V \text{ [mm]}/MP \text{ [mm]}$$

Next, the monitor display ratio of the display part is an enlarged display ratio in the monitor. Generally speaking, in the case where the display ratio is set to 100%, 1 [pix]×1 [pix] worth of information in the recorded pixels indicated in FIG. 11A is displayed as 1 [pix]×1 [pix] worth of information in the monitor. In the case where the display ratio is set to 200%, 1 [pix]×1 [pix] worth of information in the recorded pixels is displayed as 2 [pix]×2 [pix] worth of information in the monitor.

Next, as shown in FIG. 11C, the viewing distance is, for example, a distance between the user and the monitor in a Z-axis direction. The dotted line emerging from the viewpoint position of the user indicates the angle of view of the user, and is expressed as an angle θ.

In step S21, first, information of the monitor size of the display part is acquired as viewing information 1. FIG. 11D illustrates an example in a case where the monitor size Z is Z2, and the size has been reduced. Here, it is assumed that the other viewing conditions (the subject, monitor resolution, monitor display ratio, and viewing distance) are the same.

In this case, the monitor resolution R1 (the total number of pixels) is the same and the monitor size is small, and thus the size MP [mm] (MPc [mm]) of a single pixel in the monitor is smaller than in the case illustrated in FIG. 11B. Furthermore, the monitor display ratio is also the same, and thus the size of the subject displayed in the monitor is relatively small, as compared with FIG. 11B. In other words, as the monitor becomes smaller, a user observing the monitor at the same distance will have more difficulty seeing high-frequency components in the subject. To give a concrete example, in the case where a face is displayed as illustrated in FIG. 11D, the user evaluates the focus at a low-frequency part, such as a contour, rather than a high-frequency component, such as the eyelashes. G1 in FIG. 12A is an example indicating this weighting information. As in FIGS. 9A to 9F, fq1, fq2, fq3, and fq4 are the spatial frequencies set in FIG. 8B, and Nq indicates the Nyquist frequency determined by the pixel pitch of the image sensor 122.

The double dot-dash line in FIG. 12A represents an example of weighting characteristics of the spatial frequency when the monitor size is Z1. However, since the current monitor size is Z2, a ratio between the monitor sizes is Z2/Z1. At this time, using the pixel pitch MP and MPc of the monitor, which is proportional to the size of the monitor, the spatial frequency during viewing is, for example, expressed by G1, in which more weights are put on the low frequency side by MPc/MP. Although the spatial frequency characteristics (G1) of the viewing conditions 1 (monitor size) are indicated as a curve in FIG. 12A, there are discrete values corresponding to the spatial frequencies fq1, fq2, fq3, and fq4, and these are expressed as G1($n$) (where $1 \leq n \leq 4$).

Next, in step S22, information of the monitor resolution is acquired as viewing information 2. FIG. 11E illustrates an example in the case where the monitor resolution R=R2, and the resolution is lowered. Here, it is assumed that the other viewing conditions (the subject, monitor size, monitor display ratio, and viewing distance) are the same.

In this case, the monitor size Z1 is the same and the monitor resolution has decreased, and thus the size MP [mm] (MPd [mm]) of a single pixel in the monitor is larger than in the case illustrated in FIG. 11B. Furthermore, the monitor display ratio is also the same, and thus the size of the subject displayed in the monitor is relatively large, as compared with FIG. 11B. In other words, as the subject becomes larger, a user observing the monitor at the same distance will have less difficulty seeing high-frequency components in the subject. To give a concrete example, in the case where a face is displayed as indicated in FIG. 11E, the user evaluates the focus state at a high-frequency component, such as the eyelashes. G2 in FIG. 12B is an example indicating this weighting information. As in FIGS. 9A to 9F, fq1, fq2, fq3, and fq4 are the spatial frequencies set in FIG. 8B, and Nq indicates the Nyquist frequency determined by the pixel pitch of the image sensor 122.

The double dot-dash line in FIG. 12B represents an example of weighting characteristics of the spatial frequency when the monitor resolution is R1. On the other hand, the current monitor resolution is R2, and thus the monitor resolution ratio is R2/R1. At this time, using the pixel pitch MP and MPd of the monitor, which is proportional to the resolution of the monitor, the weights for the spatial frequency during viewing is, for example, expressed by G2, in which more weights are put on the high frequency side by MPd/MP. Although the spatial frequency characteristics (G2) of the viewing conditions 2 (monitor resolution) are indicated as a curve in FIG. 12B, there are discrete values corresponding to the spatial frequencies fq1, fq2, fq3, and fq4, and these are expressed as G2(*n*) (where 1≤n≤4).

Next, in step S23, information of the monitor display ratio is acquired as viewing information 3. FIG. 11F illustrates an example of a case where the monitor display ratio B is B2, and the display ratio has increased. Here, it is assumed that the other viewing conditions (the subject, monitor size, monitor resolution, and viewing distance) are the same.

In this case, the monitor size and the monitor resolution are the same, and thus the size MP [mm] of a single pixel in the monitor is the same as in FIG. 11B. However, the monitor display ratio is different, and thus the size of the subject displayed in the monitor is relatively large, as compared with FIG. 11B. In other words, as the display ratio increases, a user observing the monitor at the same distance will have less difficulty seeing high-frequency components in the subject. To give a concrete example, in the case where a face is displayed as indicated in FIG. 11F, the user evaluates the focus state at a high-frequency component, such as the eyelashes. G3 in FIG. 12C is an example indicating this weighting information. As in FIGS. 9A to 9F, fq1, fq2, fq3, and fq4 are the spatial frequencies set in FIG. 8B, and Nq indicates the Nyquist frequency determined by the pixel pitch of the image sensor 122.

The double dot-dash line in FIG. 12C represents an example of weighting characteristics of the spatial frequency when the monitor display ratio is B1. On the other hand, the current monitor display ratio is B2, and thus the ratio between monitor display ratios is B2/B1. At this time, the weights for the spatial frequency during viewing is, for example, expressed by G3, in which more weights are put on the high frequency side by B2/B1. Although the spatial frequency characteristics (G3) of the viewing conditions 3 (monitor display ratio) are indicated as a curve in FIG. 12C, there are discrete values corresponding to the spatial frequencies fq1, fq2, fq3, and fq4, and these are expressed as G3(*n*) (where 1≤n≤4).

Meanwhile, the display ratio of the monitor may be determined on the basis of the size of the subject being viewed. It is assumed that the subject acquired as indicated in FIG. 11A is constituted of afH [pix]×afV [pix]. Consider a situation where this image is displayed in the monitor as OUT_H [pix], OUT_V [pix]. In the case where the user input in step S23 is the number of pixels displayed OUT_H [pix], OUT_V [pix], the display ratio B2 can be calculated as follows, for example:

$$B2=(OUT\_H\ [pix]\times OUT\_V\ [pix])/(afH\ [pix]\times afV\ [pix])$$

Additionally, in the case where the input is a size OUTm_H [mm], OUTm_V [mm] rather than the number of pixels displayed OUT_H [pix], OUT_V [pix], the calculation may be as follows:

$$B2=(OUTm\_H\ [mm]/MP\ [mm]\times OUTm\_V\ [mm]/MP\ [mm])/(afH\ [pix]\times afV\ [pix])$$

Thus conversion may be carried out using the size MP [mm] of a single pixel in the monitor, or the user may specify a display area in the monitor.

Next, in step S24, information of the viewing distance is acquired as viewing information 4. FIG. 11G illustrates an example where the viewing distance E is E2 and the viewing distance has decreased. Here, it is assumed that the other viewing conditions (the subject, monitor size, monitor resolution, and monitor display ratio) are the same.

In this case, the monitor size and the monitor resolution are the same, and thus the size MP [mm] of a single pixel in the monitor is the same as in FIG. 11B. Additionally, the monitor display ratio is also the same, and thus the size of the subject displayed in the monitor is also the same. However, the viewing region on the monitor narrows as the viewing distance of the user decreases. FIG. 11H is a diagram illustrating a distance, in the Z-axis direction, between the user and the monitor, at the viewing distance E2. When the angle of view θ is the same, the user can visually recognize only the range indicated by the dotted line. Thus with the monitor indicated in FIG. 11G, the user confirms the displayed image while viewing the area within the dotted line. In other words, as the distance decreases, a user observing the same monitor will have less difficulty seeing high-frequency components in the subject. To give a concrete example, in the case where a face is displayed as indicated in FIG. 11G, the user evaluates the focus state at a high-frequency component, such as the eyelashes. G4 in FIG. 12D is an example indicating this weighting information. As in FIGS. 9A to 9F, fq1, fq2, fq3, and fq4 are the spatial frequencies set in FIG. 8B, and Nq indicates the Nyquist frequency determined by the pixel pitch of the image sensor 122.

The double dot-dash line in FIG. 12D represents an example of weighting characteristics of the spatial frequency when the viewing distance is E1. On the other hand, the current viewing distance is E2, the viewing distance ratio, with respect to the size of the viewing area, is E2 tan θ/E1 tan θ=E2/E1. Although the ratio in the vertical direction of the monitor screen is described here, the same applies to the horizontal direction. At this time, the weights for the spatial frequency during viewing is, for example, expressed by G4, in which more weights are put on the high frequency side by E2/E1. Although the spatial frequency characteristics (G4) of the viewing conditions 4 (viewing distance) are indicated as a curve in FIG. 12D, there are discrete values corresponding to the spatial frequencies fq1, fq2, fq3, and fq4, and these are expressed as G4(*n*) (where 1≤n≤4).

Finally, in step S25, the spatial frequency weighting coefficients for imaging are calculated from the characteristic values of the spatial frequencies obtained up to S24. The evaluation band K_IMG_fq of the captured image is calculated through the following Formula (11).

$$K\_IMG\_fq(n)=K\_IMG\_fq'(n)\times G1(n)\times G2(n)\times G3(n)\times G4(n)(1\le n\le 4) \quad (11)$$

FIG. 12E illustrates an example of the evaluation band K_IMG_fq for the captured image at monitor size of Z2, a monitor resolution of R2, display ratio of B2, and a viewing distance of E2, calculated through Formula (11). By carrying out such calculations, it is possible to quantify the degree of influence for each spatial frequency with respect to the factors in the viewing conditions that determine an in-focus state for the captured image.

FIGS. 12A to 12E illustrate a situation in which four spatial frequencies (fq1 to fq4) are used in order to simplify the descriptions. However, as the number of spatial frequencies having data increases, the spatial frequency characteristics of the captured image can be reproduced with better resolution, and the BP correction value can be calculated with higher accuracy. On the other hand, by reducing the number of spatial frequencies at which weighting is carried out, it is possible to reduce the computational amount. In addition, calculation may be carried out by holding one spatial frequency each representing the captured image evaluation band.

According to the above descriptions, the correction value can be changed according to the viewing conditions, and thus the focus detection can be corrected so as to more closely reflect the user's intentions. For example, in a large-screen environment capable of high-definition displays, such as with a 4K monitor, it is necessary to adjust the focus so as to focus on a subject at higher frequencies. In light of this, factors depending on the environment can be inputted in the present embodiment, and thus it is possible to quantify the degree of influence for each spatial frequency with respect to the factors in the viewing conditions that determine an in-focus state for the captured image.

Meanwhile, although the foregoing describes the display part is a liquid crystal monitor, the display part is not limited thereto. For example, a live view display in the camera may be used, or a projection-type monitor may be used.

Additionally, although the foregoing describes the calculation of the correction value as primarily being carried out by the camera MPU 125, the present invention is not limited thereto. For example, the correction value may be calculated by the lens MPU 117. In this case, the various types of information described using FIGS. 8A and 8B may be sent from the camera MPU 125 to the lens MPU 117, and the lens MPU 117 may then calculate the correction value using the defocus MTF information and so on. In this case, in step S8 of FIG. 6A, the lens MPU 117 may correct the in-focus position sent from the camera MPU 125 and drive the lens.

According to the present embodiment, the BP correction value for AF is calculated by focusing on the characteristics of the signal used in focus detection (vertical/horizontal, color, spatial frequency band). As such, the BP correction value can be calculated through the same method regardless of the AF method or viewing conditions. Different correction methods and data for correction are not required for individual AF methods or viewing conditions, and thus the amount of data stored and the computational load can be reduced.

Other Embodiments

Note that the present invention may be applied in a system constituted of multiple devices or in an apparatus constituted of a single device.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-126737, filed on Jun. 27, 2016, which is hereby incorporated by reference herein in its entirety.

What is claimed is:

1. A focus detection apparatus comprising:
a controller having a processor which executes instructions stored in a memory or having circuitry, the controller being configured to function as:
a focus detection unit that detects an in-focus position using an image signal obtained by an image sensor photoelectrically converting light that has entered via an imaging optical system;
a first acquisition unit that acquires aberration information of the imaging optical system;
a generating unit that generates a recording image using the image signal obtained from the image sensor;
a second acquisition unit that acquires first weighting information corresponding to a state of aberration of the imaging optical system occurring when an image based on the image signal is displayed on a display unit and viewed;
a third acquisition unit that acquires second weighting information corresponding to a state of aberration of the imaging optical system occurring when the in-focus position is detected;
a calculation unit that calculates a correction value for correcting a difference between the in-focus position detected by the focus detection unit and a position to be focused on in the recording image, on the basis of the aberration information, the first weighting information, and the second weighting information,
a correction unit that corrects the in-focus position using the correction value.

2. The focus detection apparatus according to claim 1, wherein the second acquisition unit acquires the first weighting information on the basis of image capturing conditions of the image signal and viewing conditions of the image.

3. The focus detection apparatus according to claim 1, wherein the second weighting information is determined on the basis of the image capturing conditions.

4. The focus detection apparatus according to claim 1, wherein the image capturing conditions include an image capturing condition that changes in accordance with an image processing method.

5. The focus detection apparatus according to claim 2, wherein the viewing conditions include at least one of a size of the display unit that displays the image, a resolution of the display unit, a display ratio of the display unit, a distance between the display unit and a viewer, and a value input by the viewer.

6. An image capturing apparatus comprising:
an image sensor that photoelectrically converts light that has entered via an imaging optical system into an image signal and outputs the image signal; and
a focus detection apparatus that comprises:
a controller having a processor which executes instructions stored in a memory or having circuitry, the controller being configured to function as:

a focus detection unit that detects an in-focus position using the image signal obtained by the image sensor;

a first acquisition unit that acquires aberration information of the imaging optical system;

a generating unit that generates a recording image using the image signal obtained from the image sensor;

a second acquisition unit that acquires first weighting information corresponding to a state of aberration of the imaging optical system occurring when an image based on the image signal is displayed on a display unit and viewed;

a third acquisition unit that acquires second weighting information corresponding to a state of aberration of the imaging optical system occurring when the in-focus position is detected;

a calculation unit that calculates a correction value for correcting a difference between the in-focus position detected by the focus detection unit and a position to be focused on in the recording image, on the basis of the aberration information, the first weighting information, and the second weighting information; and a correction unit that corrects the in-focus position using the correction value.

7. A lens unit comprising:

an input unit that inputs an in-focus position of a focus lens, the in-focus position being detected using an image signal obtained by an image sensor photoelectrically converting light that has entered via an imaging optical system including a lens unit having the focus lens;

a first acquisition unit that acquires first weighting information corresponding to a state of aberration of the imaging optical system occurring when an image based on the image signal is displayed in a display unit and viewed;

a second acquisition unit that acquires second weighting information corresponding to a state of aberration of the imaging optical system occurring when the in-focus position is detected;

a calculation unit that calculates a correction value, for correcting the in-focus position, from the aberration information of the imaging optical system, the first weighting information, and the second weighting information;

a correction unit that corrects the in-focus position using the correction value; and a driving unit that drives the focus lens on the basis of the corrected in-focus position, wherein the first acquisition unit acquires the first weighting information on the basis of image capturing conditions of the image signal and viewing conditions of the image.

8. The lens unit according to claim 7, wherein the second weighting information is determined on the basis of the image capturing conditions.

9. The lens unit according to claim 7, wherein the image capturing conditions include an image capturing condition that changes in accordance with an image processing method.

10. The lens unit according to claim 7, wherein the viewing conditions include at least one of a size of the display unit that displays the image, a resolution of the display unit, a display ratio of the display unit, a distance between the display unit and a viewer, and a value input by the viewer.

11. A focus detection method comprising:

detecting an in-focus position using an image signal obtained by an image sensor photoelectrically converting light that has entered via an imaging optical system;

acquiring aberration information of the imaging optical system;

generating a recording image using the image signal obtained from the image sensor;

acquiring first weighting information corresponding to a state of aberration of the imaging optical system occurring when an image based on the image signal is displayed on a display unit and viewed;

acquiring second weighting information corresponding to a state of aberration of the imaging optical system occurring when the in-focus position is detected;

calculating a correction value for correcting a difference between the detected in-focus position and a position to be focused on in the recording image, on the basis of the aberration information, the first weighting information and the second weighting information; and correcting the in-focus position using the correction value.

12. A focus detection method comprising:

inputting an in-focus position of a focus lens, the in-focus position being detected using an image signal obtained by an image sensor photoelectrically converting light that has entered via an imaging optical system including a lens unit having the focus lens;

acquiring first weighting information corresponding to a state of aberration of the imaging optical system occurring when an image based on the image signal is displayed in a display unit and viewed;

acquiring second weighting information corresponding to a state of aberration of the imaging optical system occurring when the in-focus position is detected;

calculating a correction value, for correcting the in-focus position, from the aberration information of the imaging optical system, the first weighting information, and the second weighting information;

correcting the in-focus position using the correction value; and acquiring the first weighting information on the basis of image capturing conditions of the image signal and viewing conditions of the image.

13. A non-transitory computer-readable storage medium on which is stored a program for causing a computer to execute the steps of the focus detection method, comprising:

detecting an in-focus position using an image signal obtained by an image sensor photoelectrically converting light that has entered via an imaging optical system;

acquiring aberration information of the imaging optical system;

generating a recording image using the image signal obtained from the image sensor;

acquiring first weighting information corresponding to a state of aberration of the imaging optical system occurring when an image based on the image signal is displayed on a display unit and viewed;

acquiring second weighting information corresponding to a state of aberration of the imaging optical system occurring when the in-focus position is detected;

calculating a correction value for correcting a difference between the detected in-focus position and a position to be focused on in the recording image, on the basis of the aberration information, the first weighting information and the second weighting information; and correcting the in-focus position using the correction value.

14. A non-transitory computer-readable storage medium on which is stored a program for causing a computer to execute the steps of the focus detection method, comprising:

inputting an in-focus position of a focus lens, the in-focus position being detected using an image signal obtained by an image sensor photoelectrically converting light that has entered via an imaging optical system including a lens unit having the focus lens;

acquiring first weighting information corresponding to a state of aberration of the imaging optical system occurring when an image based on the image signal is displayed in a display unit and viewed, the first weighting information being acquired on the basis of image capturing conditions of the image signal and viewing conditions of the image;

acquiring second weighting information corresponding to a state of aberration of the imaging optical system occurring when the in-focus position is detected;

calculating a correction value, for correcting the in-focus position, from the aberration information of the imaging optical system, the first weighting information, and the second weighting information; and correcting the in-focus position using the correction value.

* * * * *